US010088766B2

(12) United States Patent
Santo et al.

(10) Patent No.: US 10,088,766 B2
(45) Date of Patent: Oct. 2, 2018

(54) LAYERED INORGANIC MINERAL, TONER, AND IMAGE FORMING APPARATUS

(71) Applicants: Hideyuki Santo, Kanagawa (JP); Tsuyoshi Sugimoto, Shizuoka (JP); Shinya Nakayama, Shizuoka (JP); Suzuka Amemori, Shizuoka (JP); Hiroshi Yamada, Shizuoka (JP); Ryuta Chiba, Kanagawa (JP); Kohsuke Nagata, Shizuoka (JP)

(72) Inventors: Hideyuki Santo, Kanagawa (JP); Tsuyoshi Sugimoto, Shizuoka (JP); Shinya Nakayama, Shizuoka (JP); Suzuka Amemori, Shizuoka (JP); Hiroshi Yamada, Shizuoka (JP); Ryuta Chiba, Kanagawa (JP); Kohsuke Nagata, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/538,717

(22) PCT Filed: Nov. 30, 2015

(86) PCT No.: PCT/JP2015/005945
§ 371 (c)(1),
(2) Date: Jun. 22, 2017

(87) PCT Pub. No.: WO2016/103582
PCT Pub. Date: Jun. 30, 2016

(65) Prior Publication Data
US 2017/0371257 A1   Dec. 28, 2017

(30) Foreign Application Priority Data

Dec. 24, 2014  (JP) .................. 2014-259773

(51) Int. Cl.
G03G 9/097 (2006.01)
G03G 9/087 (2006.01)
(Continued)

(52) U.S. Cl.
CPC ......... *G03G 9/08755* (2013.01); *C01B 33/44* (2013.01); *G03G 9/0806* (2013.01);
(Continued)

(58) Field of Classification Search
CPC ................ G03G 9/09708; G03G 9/09725
See application file for complete search history.

(56) References Cited

U.S. PATENT DOCUMENTS

2006/0240351 A1    10/2006 Sugiura et al.
2008/0227013 A1*   9/2008 Kadota ............... G03G 9/0804
                                                       430/108.15

(Continued)

FOREIGN PATENT DOCUMENTS

JP        2579150      11/1996
JP      11-209386      8/1999
(Continued)

OTHER PUBLICATIONS

Translation of JP 2001-002524 published Jan. 2001.*
(Continued)

*Primary Examiner* — Peter L Vajda
(74) *Attorney, Agent, or Firm* — Oblon, McClelland, Maier & Neustadt, L.L.P.

(57) ABSTRACT

A layered inorganic mineral including a surface treated with a fluorine-containing compound, where the layered inoganic mineral that can be favorably used for a toner that is excellent in high charging ability, charging stability, and low temperature fixing ability, and that can exhibits high reliability during cleaning.

6 Claims, 1 Drawing Sheet

(51) Int. Cl.
    *G03G 9/08* (2006.01)
    *C01B 33/44* (2006.01)
    *C01B 33/40* (2006.01)
    *G03G 9/09* (2006.01)
    *G03G 5/147* (2006.01)

(52) U.S. Cl.
    CPC .......... *C01B 33/40* (2013.01); *G03G 5/14708* (2013.01); *G03G 9/0904* (2013.01); *G03G 9/09766* (2013.01); *G03G 9/09775* (2013.01)

(56) References Cited

U.S. PATENT DOCUMENTS

2008/0233498 A1* 9/2008 Yamada .............. G03G 9/0804 430/48
2015/0086916 A1* 3/2015 Morales-Tirado ... G03G 9/0819 430/105

FOREIGN PATENT DOCUMENTS

| JP | 2001-002524 | * | 1/2001 | ............... A61K 7/00 |
|---|---|---|---|---|
| JP | 2002-287400 | | 10/2002 | |
| JP | 2002-351143 | | 12/2002 | |
| JP | 2003-095639 | | 4/2003 | |
| JP | 2004-046095 | | 2/2004 | |
| JP | 2005-115213 | | 4/2005 | |
| JP | 3762075 | | 1/2006 | |
| JP | 4011246 | | 9/2007 | |
| JP | 2007-271789 | | 10/2007 | |
| JP | 2007-272205 | | 10/2007 | |
| JP | 2008-166177 | | 7/2008 | |
| JP | 2008-262150 | | 10/2008 | |
| JP | 2009-280443 | | 12/2009 | |
| JP | 2010-242026 A | | 10/2010 | |
| JP | 2013-152875 | | 8/2013 | |
| JP | 2014-178547 | | 9/2014 | |

OTHER PUBLICATIONS

Extended European Search Report dated Oct. 26, 2017 in Patent Application No. 15872159.7.
International Search Report dated Jan. 26, 2016 for counterpart International Patent Application No. PCT/JP2015/005945 filed Nov. 30, 2015.

* cited by examiner

[Fig. 1]
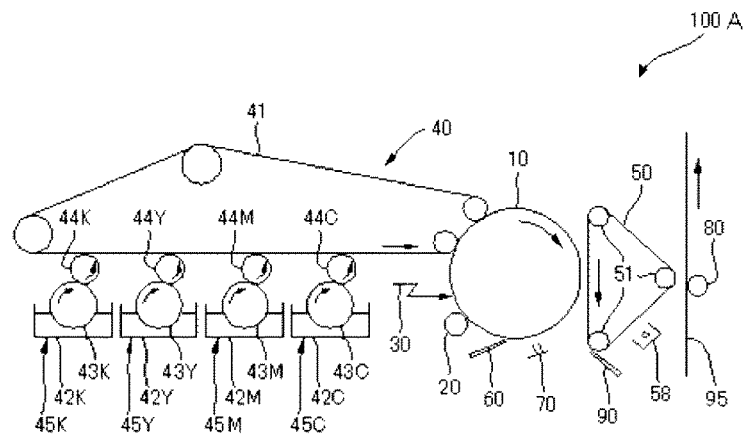
[Fig. 2]
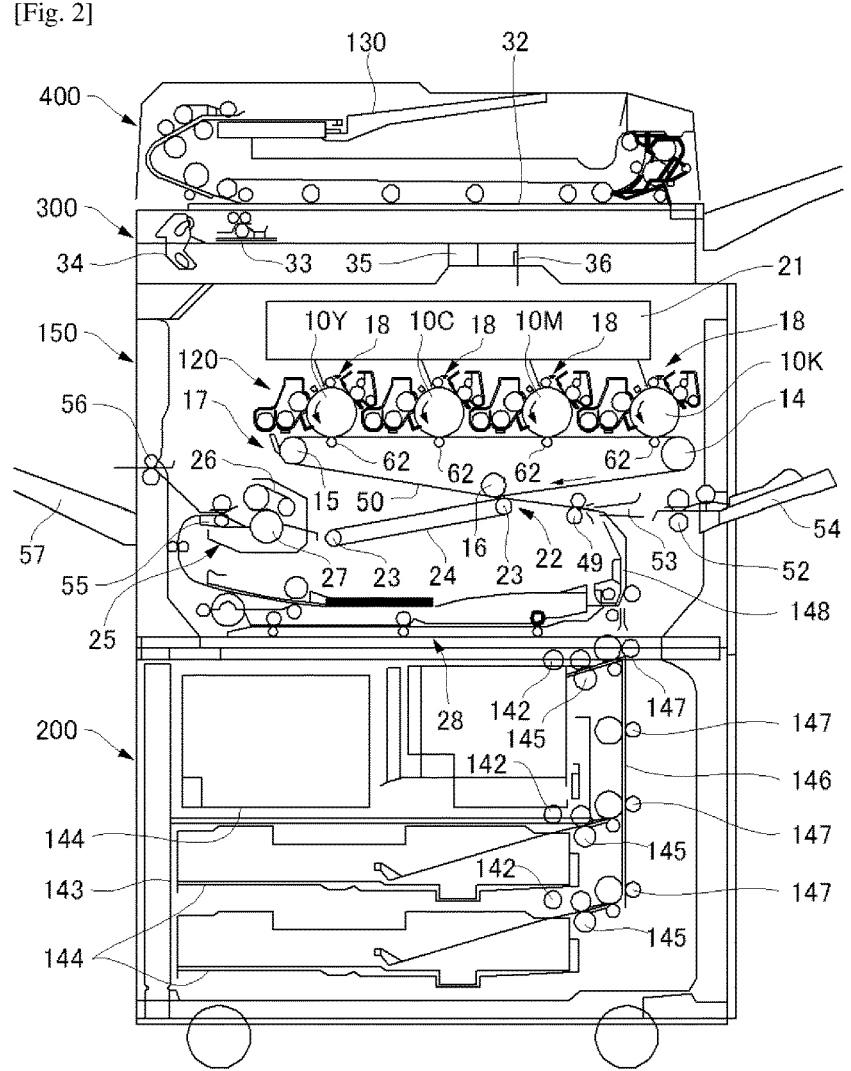

LAYERED INORGANIC MINERAL, TONER, AND IMAGE FORMING APPARATUS

TECHNICAL FIELD

The present invention relates to a layered inorganic mineral, a toner containing the layered inorganic mineral, and an image forming apparatus.

BACKGROUND ART

In recent years, toners have been required to have smaller particle diameters and hot offset resistance for increasing quality of output images, to have low temperature fixing ability for energy saving, and to have heat resistant storage stability for the toners to be resistant to high-temperature, high-humidity conditions during storage and transportation after production. In particular, improvement in low temperature fixing ability is very important because power consumption in fixing occupies much of power consumption in an image forming step.

In order to attain high-level low temperature fixing ability, there is a proposed toner containing a resin including a crystalline polyester resin, and a release agent, where the resin and a wax are incompatible to each other to form a phase separation structure in a sea-island form (see, for example, PTL 1).

This technique can achieve the toner excellent in low temperature fixing ability and heat resistant storage stability, but the toner containing the crystalline polyester tends to have low charging.

In order to improve charging, the toner generally includes a charge controlling agent containing an ionic compound such as a complex and an ammonium salt. However, these ionic compounds are easily dissolved in water. Therefore, in a polymerizing method in which particles are formed in an aqueous medium, the charge controlling agent present on the surface of the toner is dissolved in the aqueous medium, and thus the toner excellent in charging ability cannot be obtained. The toner containing the layered inorganic compound can improve charging ability of the toner without the charge controlling agent dissolved in the aqueous medium. Moreover, there is a proposed method for improving charging ability by modifying a part of materials present between layers of the layered inorganic compound to unevenly distribute the layered compounds on the surface of the toner (see, for example, PTL 2). Moreover, there is another proposed method for improving charging ability by binding a compound having a polar group such as fluorine onto the surface of the toner (see, for example, PTL 3).

CITATION LIST

Patent Literature

PTL 1: Japanese Patent Application Laid-Open (JP-A) No. 2004-46095
PTL 2: JP-A No. 2008-262150
PTL 3: JP-A No. 2005-115213

SUMMARY OF INVENTION

Technical Problem

An object of the present invention is to provide a layered inorganic mineral that can be favorably used for a toner, where the toner is excellent in high charging ability, charging stability, and low temperature fixing ability, and can exhibit high reliability during cleaning.

Solution to Problem

As means for solving the above problems, a layered inorganic mineral will be described below. That is,
a layered inorganic mineral of the present invention includes a surface treated with a fluorine-containing compound.

Advantageous Effects of Invention

According to the present invention, it is possible to provide a layered inorganic mineral that can be favorably used for a toner, where the toner is excellent in high charging ability, charging stability, and low temperature fixing ability, and can exhibit high reliability during cleaning.

BRIEF DESCRIPTION OF DRAWINGS

FIG. 1 is a schematic structural view of one example of an image forming apparatus of the present invention.
FIG. 2 is a schematic structural view of another example of an image forming apparatus of the present invention.

DESCRIPTION OF EMBODIMENTS (Toner)
A toner of the present invention contains at least a polyester resin and the layered inorganic mineral described below, and further contains other components such as a colorant if necessary. Moreover, the toner of the present invention may contain a crystalline polyester resin.

In the technique described in the above Patent Literature 2, slow charge rising easily causes abnormal images such as background fog. In an attempt to further raise charging, there are problems that the toner containing a higher amount of the layered inorganic mineral causes deterioration of low temperature fixing ability and different shapes of the toner, and abnormal images due to degradation of flowability are more easily formed to cause, which is not sufficient for the toner in terms of low temperature fixing ability and charging ability.

In the technique described in the above Patent Literature 3, when a high-speed device is used, the compound is released or buried in toner particles through application of strong stress in the developing device, and thus there is a problem that an image cannot be stably obtained for a long term.

Therefore, there is a need for a toner exhibiting good charging ability (e.g., excellence in charge rising and charging stability under high temperature and high humidity); satisfying low temperature fixing ability; and preventing abnormal images such as void after transfer.

It has been found that the toner having the above constitution defined in the present invention can be a toner having such high quality.

<Layered Inorganic Mineral>

The surface of the layered inorganic mineral is treated with a fluorine-containing compound.

Moreover, the layered inorganic mineral may be a modified layered inorganic mineral.

The layered inorganic mineral of the present invention means a layered inorganic mineral, in which layers each having a thickness of several nanometers are laminated on top of one another. The term "modified" means that organic ions are introduced into ions present between the layers, which is referred to as "intercalation" in the broad sense. JP-A No. 2003-202708 describes the modified layered inorganic mineral obtained by modifying the layered inorganic mineral with organic cations. As the layered inorganic mineral, smectite (e.g., montmorillonite and saponite), kaolin (e.g., kaolinite), magadiite, and kanemite are known. Japanese Translation of PCT International Application Publication (No. JP-T) 2006-500605 and No. JP-T 2006-503313 describe the modified layered inorganic mineral obtained by modifying the layered inorganic mineral with organic anions. As this modified layered inorganic mineral, the organic anion-modified hydrotalcite that is a layered composite hydroxide salt is known. The modified layered inorganic mineral has high hydrophilicity because of the modified layered structure. Therefore, when a layered inorganic mineral without modification is dispersed in an aqueous medium to granulate a toner, the layered inorganic mineral is transferred into the aqueous medium, and thus the toner particles deformed cannot be obtained. However, the layered inorganic mineral modified with organic ions enables toner to have appropriate hydrophobicity, and thus an excessive amount of the modified layered inorganic minerals exist in the toner particles in the vicinity of the surface of the toner particles. Therefore, the toner particles are easily deformed during granulation, and the resultant toner particles are dispersed to be micronized. As a result, the resultant toner can achieve sufficient adjustment of electrical charges. Moreover, it is believed that the modified layered inorganic mineral rarely influences the toner to be fixed at low temperature, and thus a large amount of modified layered inorganic minerals presents in the surface of the toner particles prevent the toner from being fixed at low temperature. However, a small amount of the modified layered inorganic minerals enable the toner particles to have different shapes and enable the toner to adjust electrical charges, which can achieve the toner excellent in controlling shapes, adjusting electrical charges, and fixing the toner at low temperature.

It is desirable that the modified layered inorganic mineral used in the present invention be a material having a basic crystal structure (e.g., smectite) modified with organic cations. A smectite clay mineral has negatively charged layers, and cations are present between the layers of the smectite clay mineral in order to neutralize the negatively charged layers. Exchange of these cations and adsorption of polar molecules can cause intercalation compounds. A part of bivalent metals of the layered inorganic mineral is substituted with a trivalent metal, which leads to introducing metal ions into the layered inorganic mineral. However, the layered inorganic mineral to which metal ions are introduced has high hydrophilicity, and thus it is preferred that at least one of the metal ions of the layered inorganic compound be modified with the organic anion. Therefore, the thus-obtained layered inorganic compound can have appropriate hydrophilicity.

As an organic ion modifying agent for modifying at least part of the ions in the layered modified mineral with organic ions to obtain the modified layered inorganic mineral, a quaternary alkylammonium salt, a phosphonium salt, and an imidazolium salt are used, but a quaternary alkylammonium salt is preferably used. Examples of the quaternary alkylammonium salt include trimethyl stearyl ammonium, dimethyl stearyl benzyl ammonium, dimethyl octadecyl ammonium, and oleyl bis(2-hydroxyethyl)methyl ammonium.

As the modified layered inorganic mineral, kaolinite, a layered phosphate salt, and a layered composite hydroxide salt can be used. In this case, as the modifying agent, an organic ion modifying agent can be appropriately selected depending on intended charges of the layer. It is desirable that the organic ion modifying agent be used for the negatively charged layer, and sulphate including for example, branched, unbranched, or cyclic alkyl (C1 to C44), alkenyl (C2 to C22), alkoxy (C8 to C32), hydroxyalkyl (C2 to C22), ethylene oxide, and propylene oxide; sulfonate; carboxylate; and phosphate can be used for the positively charged layer. Carboxylate having an ethylene oxide skeleton is preferable.

The layered inorganic mineral, at least part of which is modified with organic ions, enables the toner to have an appropriate hydrophobicity, enables an oil phase containing a toner composition and/or a precursor of the toner composition to have non-newtonian viscosity, and thus enables toner to have different shapes of particles. An amount of the layered inorganic mineral, at least part of which is modified with organic ions, in toner materials is preferably 0.05% by mass to 10 % by mass, more preferably 0.05% by mass to 5% by mass. Here, the term "toner composition" means various materials constituting the toner, and the term "precursor of the toner composition" means substances/materials to be materials constituting the toner through reaction.

The modified layered inorganic mineral, at least part of which is modified with organic ions, can be appropriately selected, and examples thereof include montmorillonite, bentonite, hectorite, attapulgite, sepiolite, and a mixture thereof. Among them, modified organic montmorillonite or bentonite is preferable because the modified organic montmorillonite or bentonite does not adversely influence toner property, easily can adjust viscosity of the toner, and can be lowered in an amount in use.

Example of the commercially available products of the modified layered inorganic mineral, at least part of which is modified with organic cations, include: QUATERNIUM-18 BENTONITE such as BENTONE 3, BENTONE 38, BENTONE 38V (products of Rheox), TIXOGEL VP (product of United catalyst LLC), CLAYTON 34, CLAYTON 40, CLAYTON XL (product of Southern Clay); stearalkonium bentonite such as BENTONE 27 (products of Rheox), TIXOGEL LG (product of United catalyst LLC), CLAYTON AF, and CLAYTON APA (products of Southern Clay); and quaternium-18/benzalkonium bentonite such as CLAYTON HT and CLAYTON PS (products of Southern Clay). CLAYTON AF and CLAYTON APA are particularly preferable. As the modified layered inorganic mineral, at least part of which is modified with organic anions, a product obtained by modifying DHT-4A (product of Kyowa Chemical Industry Co., Ltd.) with organic anions represented by the following General Formula (1) is particularly preferable. A compound represented by the following General Formula (1) is, for example, HITENOL 330T (product of DKS Co. Ltd.).

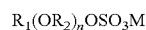
$R_1(OR_2)_nOSO_3M$  General Formula (1)

(In the General Formula (1), $R_1$ represents an alkyl group having 13 carbon atoms, and $R_2$ represents an alkylene group having 2 to 6 carbon atoms. n represents an integer of 2 to 10, and M represents a monovalent metal element.)

Use of the modified layered inorganic mineral makes the toner have an appropriate hydrophobicity. In the course of producing the aforementioned toner, the oil phase containing the toner composition and/or the precursor of the toner composition can have non-newtonian viscosity, and thus toner particles deformed can be obtained. The layered inorganic mineral was charged by organic ions, and an excessive amount of the modified layered inorganic minerals exist on the surface of the toner particles. Therefore, charging ability of the toner can be obtained.

A surface of the layered inorganic mineral of the present invention is treated with a fluorine-containing compound.

The fluorine-containing compound preferably contains a fluoroalkyl group.

The surface of the layered inorganic mineral of the present invention may be treated with a coupling agent. Examples of the coupling agent include a silane coupling agent, an alumina coupling agent, and a titanate coupling agent. These coupling agents can be inorganic salts, organic salts of Si, Al, or Ti, and organic compounds containing one or more hydrophobic alkoxyl group (e.g., alkylalkoxyl group). Among them, a silane coupling agent can be preferably used.

Moreover, the above silane coupling agent preferably contains a fluorine compound.

As the silane coupling agent, the compound represented by the following General Formula (2) can be preferably used.

$$RaSiRb_3 \qquad \text{General Formula (2)}$$

(In the General Formula (2), Ra is a hydrocarbon containing a fluoromethyl group, and may include a functional group. Rb is a hydrolyzable group or a hydroxyl group.)

In the silane coupling agent represented by the above General Formula (2), Ra is a hydrocarbon group including the fluoromethyl group. Examples of the hydrocarbon group include saturated or unsaturated, straight-chain or branched-chain, aliphatic hydrocarbon group, aromatic hydrocarbon group, and alicyclic hydrocarbon group. These hydrocarbon group may be monovalent or multivalent.

In the case of the aliphatic hydrocarbon group, the number of carbon atoms in the hydrocarbon group is 1 to 25, particularly preferably 1 to 3. In the case of the aromatic hydrocarbon group, the number thereof is 6 to 25, particularly preferably 6 to 10. In the case of the alicyclic hydrocarbon group, the number thereof is 3 to 25, particularly preferably 3 to 6.

In the silane coupling agent represented by the above General Formula (2), Rb is a hydrolyzable group or a hydroxyl group. Examples of the hydroxyl group include an alkoxy group, an alkenyloxy group, a ketoxime group, an acyloxy group, an amino group, an aminoxy group, an amido group, and a halogen atom.

Specific examples of the silane coupling agent represented by the above General Formula (2) include trifluoromethyl trimethoxysilane, 2,2,2-trifluoroethyl trimethoxysilane, 3,3,3-trifluoropropyl trimethoxysilane, trifluoromethyl triethoxysilane, 2,2,2-trifluoroethyl triethoxysilane, 3,3,3-trifluoropropyl triethoxysilane, 2-ethyl6,6,6-trifluorohexyl trimethoxysilane, 2-hexenyl5,5,5-trifluorotrimethoxysilane, and p-trifluoromethyl phenyl trimethoxysilane.

These coupling agents may be used alone or in combination thereof.

The layered inorganic mineral is treated with the coupling agent, and thus the surface thereof is covered with the fluorine compound having high polarity. Therefore, when the layered inorganic mineral is added to the toner, the resultant toner can exhibit high charging ability.

<Polyester Resin>

The polyester resin, as the constituent component, contains a diol component, preferably contains a cross-linkage component and a dicarboxylic acid component.

The polyester resin is preferably a non-crystalline polyester resin.

The polyester resin may contain an aliphatic diol having 3 to 12 carbon atoms as the diol component. The polyester resin preferably contains the aliphatic diol in an amount of 50 mol % or more, more preferably contains the aliphatic diol in an amount of 80 mol % or more, still more preferably contains the aliphatic diol in an amount of 90 mol % or more.

The polyester resin preferably contains trihydric or higher aliphatic alcohol as the cross-linkage component.

In order to improve low temperature fixing ability, it is believed that a method for lowering a molecular weight or a method for lowering a glass transition temperature is used so that a polyester resin (e.g., a non-crystalline polyester resin) and a crystalline polyester resin melt together. However, when melt viscosity has been lowered by simply lowering a glass transition temperature of the polyester resin, or lowering a molecular weight of the polyester resin, it is easily conceived that the resultant toner may be deteriorated in heat resistant storage stability and high temperature offset property during fixing.

Meanwhile, when the polyester resin contains a diol component as the constituent component, where the diol component is an aliphatic diol having 3 to 12 carbon atoms, and contains the aliphatic diol in an amount of 50 mol % or more, the toner is lowered in the glass transition temperature and melt viscosity, and thus the resultant toner can achieve low temperature fixing ability. When the polyester resin contains a trihydric or higher aliphatic alcohol as the cross-linkage component, the polyester resin includes branched structures in a molecular skeleton, and thus molecular chains become three-dimensional molecular chains. Therefore, the polyester resin is deformed at low temperature, and exhibits rubber-like properties that it does not flow. As a result, heat resistant storage stability and hot offset resistance of the toner can be retained.

At this time, a trivalent or higher carboxylic acid or an epoxy resin can be used as the cross-linkage component. However, carboxylic acid is often used for an aromatic compound, density of an ester bond in a cross-linkage portion tends to be high, and thus glossiness of the fixed images produced by fixing the toner with heat may not be sufficiently obtained. When the cross-linking agent such as epoxy is used, cross-linking reaction is undergone after polymerizing the polyester, distance between cross-linking points is difficult to control, desired viscoelasticity of the toner cannot be obtained, the polyester reacts with oligomer generated during production of polyester to form a portion having high density of a cross-linkage with ease. As a result, un-evenness of the fixed images occurs and thus the fixed image may be deteriorated in glossiness and image density.

Examples of the aliphatic diol having 3 to 12 carbon atoms include 1,2-propylene glycol, 1,3- propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol.

In particular, in the polyester resin, it is more preferred that the diol component be an aliphatic diol having 4 to 12 carbon atoms, that a portion of the diol component to be a main chain have an odd number of carbon atoms, and that the diol component contain an alkyl group in a side chain of the diol component.

One example of the aliphatic diol having 4 to 12 carbon atoms, which contains an alkyl group in a side chain thereof, and includes the portion of the aliphatic diol to be a main chain having an odd number of carbon atoms, is an aliphatic diol represented by General Formula (3) below.

  General Formula (3)

Here, in the General Formula (3), $R^3$ and $R^4$ each independently represent a hydrogen atom and an alkyl group having 1 to 3 carbon atoms. n represents an odd number that is from 3 to 9. In units repeated n times, $R^3$ may be identical or different. In units represented n times, $R^4$ may be identical or different.

In the polyester resin, the cross-linkage component contains a trihydric or higher aliphatic alcohol, preferably contains a trihydric aliphatic alcohol or a tetrahydric aliphatic alcohol, in terms of image density and image glossiness of the fix image. The cross-linkage component may contain the trihydric or higher aliphatic alcohol alone.

Examples of the trihydric or higher aliphatic alcohol include glycerin, trimethylol ethane, trimethylol propane, pentaerythritol, sorbitol, and dipentaerythritol.

A ratio of the cross-linkage component to the constituent component of the polyester resin is not particularly limited and may be appropriately selected depending on the intended purpose, but it is preferably 0.5% by mass to 5% by mass, more preferably 1% by mass to 3% by mass.

A ratio of the trihydric or higher aliphatic alcohol to the polyhydric alcohol component, which is a constituent component of the polyester resin, is not particularly limited and may be appropriately selected depending on the intended purpose, but it is preferably 50% by mass to 100% by mass, more preferably 90% by mass to 100% by mass.

In order to lower a Tg of the polyester resin and in order to easily impart property of deforming at a low temperature, it is preferred that the polyester resin contain a dicarboxylic acid component as a constituent component, and the dicarboxylic acid component contains an aliphatic dicarboxylic acid having 4 to 12 carbon atoms.

The polyester resin preferably contains the aliphatic dicarboxylic acid having 4 to 12 carbon atoms in an amount of 50 mol % or more but less than 60 mol %.

Examples of the aliphatic dicarboxylic acid having 4 to 12 carbon atoms include succinic acid, glutaric acid, adipic acid, pimelic acid, suberic acid, azelaic acid, sebacic acid, and dodecanedioic acid.

The polyester resin preferably includes at least one selected from a urethane bond and a urea bond because the toner is more excellent in adhesive property to recording medium such as paper. The polyester resin contains at least one selected from the urethane bond and the urea bond, and thus the urethane bond or the urea bond exhibits behaviors like pseudo-crosslinked points. Therefore, the polyester resin exhibits strong rubber-like properties, and thus the resultant toner is more excellent in heat resistant storage stability and hot offset resistance.

In order to produce the polyester resin containing at least one selected from the urethane bond and the urea bond, as described hereinafter, the polyester resin can be allowed to react with polyisocyanate (here, in the present invention, a product obtained by reacting with polyisocyanate is referred to as "modified polyester resin").

The polyester resin may be used alone or in combination of another polyester resin.

The another polyester resin, as the constituent component, contains a diol component and a dicarboxylic acid component. Note that, the another polyester resin may or may not contain an aliphatic diol having 3 to 12 carbon atoms as the constituent component. The another polyester resin may or may not contain the cross-linkage component as the constituent component.

Moreover, the another polyester resin may be an unmodified polyester resin. Here, the unmodified polyester resin is a polyester resin that is not modified with, for example, an isocyanate compound.

—Diol Component—

The diol component is not particularly limited and may be appropriately selected depending on the intended purpose. Examples thereof include aliphatic diols such as ethylene glycol, 1,2-propylene glycol, 1,3-propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol; diols containing an oxyalkylene group such as diethylene glycol, triethylene glycol, dipropylene glycol, polyethylene glycol, polypropylene glycol and polytetramethylene glycol; alicyclic diols such as 1,4-cyclohexane dimethanol and hydrogenated bisphenol A; adducts of alicyclic diols with alkylene oxides such as ethylene oxide, propylene oxide, and butylene oxide; bisphenols such as bisphenol A, bisphenol F and bisphenol S; and adducts of bisphenols with alkylene oxides such as ethylene oxide, propylene oxide, and butylene oxide. Among them, aliphatic diols having 4 to 12 carbon atoms are preferred.

These diols may be used alone or in combination of two or more thereof.

—Dicarboxylic Acid Component—

The dicarboxylic acid component is not particularly limited and may be appropriately selected depending on the intended purpose. Examples thereof include aliphatic dicarboxylic acids and aromatic dicarboxylic acids. Besides, anhydrides thereof, lower (having 1 to 3 carbon atoms) alkyl-esterified compounds thereof, or halides thereof may also be used.

The aliphatic dicarboxylic acid is not particularly limited and may be appropriately selected depending on the intended purpose. Examples thereof include succinic acid, adipic acid, sebacic acid, decanedioic acid, maleic acid, and fumaric acid.

The aromatic dicarboxylic acid is not particularly limited and may be appropriately selected depending on the intended purpose. Examples thereof include phthalic acid, isophthalic acid, terephthalic acid, and naphthalene dicarboxylic acid.

Among them, an aliphatic dicarboxylic acids having 4 to 12 carbon atoms are preferable.

These dicarboxylic acids may be used alone or in combination of two or more thereof.

—Trihydric or Higher Alcohol—

The trihydric or higher alcohol is not particularly limited and may be appropriately selected depending on the intended purpose. Examples thereof include glycerin, trimethylol ethane, trimethylol propane, pentaerythritol, sorbitol, and dipentaerythritol.

Among them, a trihydric aliphatic alcohol or a tetrahydric aliphatic alcohol is preferable. A trihydric aliphatic alcohol and a tetrahydric aliphatic alcohol may be used alone or in combination thereof.

—Polyester Resin Having at Least One Selected From Urethane Bond and Urea Bond—

The polyester resin having at least one selected from a urethane bond and a urea bond is not particularly limited and may be appropriately selected depending on the intended purpose. Examples thereof include a product obtained by reacting a polyester resin having an active hydrogen group with polyisocyanate, which is preferably used as a reaction precursor (hereinafter may be referred to as a "prepolymer") that is allowed to react with the curing agent. Moreover, the polyester resin having at least one selected from a urethane bond and a urea bond may be a reaction product with the reaction precursor and the curing agent.

Examples of the polyester resin having the active hydrogen group include a polyester resin having a hydrogen group.

—Polyisocyanate—

The polyisocyanate is not particularly limited and may be appropriately selected depending on the intended purpose. Examples thereof include diisocyanate, and trivalent or higher isocyanate.

Examples of the diisocyanate include: aliphatic diisocyanate; alicyclic diisocyanate; aromatic diisocyanate; aromatic aliphatic diisocyanate; isocyanurate; and a block product thereof where the foregoing compounds are blocked with a phenol derivative, oxime, or caprolactam.

Examples of the trivalent or higher isocyanate include lysine triisocyanate and a compound obtained by reacting trihydric or higher alcohol with diisocyanate.

The aliphatic diisocyanate is not particularly limited and may be appropriately selected depending on the intended purpose. Examples thereof include tetramethylene diisocyanate, hexamethylene diisocyanate, 2,6-diisocyanato methyl caproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected depending on the intended purpose. Examples thereof include isophorone diisocyanate, and cyclohexylmethane diisocyanate.

The aromatic diisocyanate is not particularly limited and may be appropriately selected depending on the intended purpose. Examples thereof include tolylene diisocyanate, diisocyanato diphenyl methane, 1,5-nephthylene diisocyanate, 4,4'-diisocyanato diphenyl, 4,4'-diisocyanato-3,3'-dimethyldiphenyl, 4,4'-diisocyanato-3-methyldiphenyl methane, and 4,4'-diisocyanato-diphenyl ether.

The aromatic aliphatic diisocyanate is not particularly limited and may be appropriately selected depending on the intended purpose. Examples thereof include a,a,a',a'-tetramethylxylene diisocyanate.

The isocyanurate is not particularly limited and may be appropriately selected depending on the intended purpose. Examples thereof include tris(isocyanatoalkyl)isocyanurate, and tris(isocyanatocycloalkyl)isocyanurate.

These polyisocyanates may be used alone or in combination of two or more thereof.

—Curing Agent—

The curing agent is not particularly limited and may be appropriately selected depending on the intended purpose, so long as it can react with a polymer to produce the polyester resin. Examples thereof include an active hydrogen group-containing compound.

—Active Hydrogen Group-containing Compound—

An active hydrogen group in the active hydrogen group-containing compound is not particularly limited and may be appropriately selected depending on the intended purpose. Examples thereof include a hydroxyl group (e.g., an alcoholic hydroxyl group, and a phenolic hydroxyl group), an amino group, a carboxyl group, and a mercapto group. These may be used alone or in combination of two or more thereof.

The active hydrogen group-containing compound is not particularly limited and may be appropriately selected depending on the intended purpose, but it is preferably amines, because it can form a urea bond.

The amines are not particularly limited and may be appropriately selected depending on the intended purpose. Examples thereof include diamine, trivalent or higher amine, amino alcohol, amino mercaptan, amino acid, and compounds in which the amino groups of the foregoing compounds are blocked. These may be used alone or in combination of two or more thereof.

Among them, diamine, and a mixture of diamine and a small amount of trivalent or higher amine are preferable.

The diamine is not particularly limited and may be appropriately selected depending on the intended purpose. Examples thereof include aromatic diamine, alicyclic diamine, and aliphatic diamine. The aromatic diamine is not particularly limited and may be appropriately selected depending on the intended purpose. Examples thereof include phenylenediamine, diethyl toluene diamine, and 4,4'-diaminodiphenylmethane. The alicyclic diamine is not particularly limited and may be appropriately selected depending on the intended purpose. Examples thereof include 4,4'-diamino-3,3'-dimethyldicyclohexyl methane, diamino cyclohexane, and isophoronediamine. The aliphatic diamine is not particularly limited and may be appropriately selected depending on the intended purpose. Examples thereof include ethylene diamine, tetramethylene diamine, and hexamethylenediamine.

The trivalent or higher amine is not particularly limited and may be appropriately selected depending on the intended purpose. Examples thereof include diethylenetriamine, and triethylene tetramine.

The amino alcohol is not particularly limited and may be appropriately selected depending on the intended purpose. Examples thereof include ethanol amine, and hydroxyethyl aniline.

The aminomercaptan is not particularly limited and may be appropriately selected depending on the intended purpose. Examples thereof include aminoethyl mercaptan, and aminopropyl mercaptan.

The amino acid is not particularly limited and may be appropriately selected depending on the intended purpose. Examples thereof include aminopropionic acid, and aminocaproic acid.

The compound where the amino group is blocked is not particularly limited and may be appropriately selected depending on the intended purpose. Examples thereof include a ketimine compound where the amino group is blocked with ketone such as acetone, methyl ethyl ketone, methyl isobutyl ketone, and an oxazoline compound.

A molecular structure of the polyester resin can be confirmed by solution-state or solid-state NMR, X-ray diffraction, GC/MS, LC/MS, or IR spectroscopy. Simple methods for confirming the molecular structure thereof include a method for detecting, as the polyester resin, one that does not have absorption based on $\delta CH$ (out-of-plane bending vibration) of olefin at 965 $cm^{-1} \pm 10$ $cm^{-1}$ and 990 $cm^{-1} \pm 10$ $cm^{-1}$ in an infrared absorption spectrum.

An amount of the polyester resin is not particularly limited and may be appropriately selected depending on the intended purpose, but it is preferably 50 parts by mass to 90 parts by mass, more preferably 70 parts by mass to 85 parts by mass, relative to 100 parts by mass of the toner. When the amount thereof is less than 50 parts by mass, the toner may be deteriorated in low temperature fixing ability and hot offset resistance. When the amount thereof is more than 90 parts by mass, the toner may be deteriorated in heat resistant storage stability, images obtained after fixing may be deteriorated in glossiness and degree of coloring. The amount thereof falling within the more preferable range is advantageous in that the toner may be excellent in all of low temperature fixing ability, hot offset resistance, and heat resistant storage stability.

<Crystalline Polyester Resin>

Crystalline polyester resin exhibits heat melting characteristics where it causes drastic viscosity lowering at temperature around fixing onset temperature, since it has high crystallinity. By using the crystalline polyester resin having these characteristics together with the polyester resin, the heat resistant storage stability of the toner is excellent up to the melt onset temperature owing to crystallinity, and the toner drastically decreases its viscosity at the melt onset temperature because of melting of the crystalline polyester resin. Along with the drastic decrease in viscosity, the crystalline polyester resin melts together with the polyester resin, to drastically decrease their viscosity to be fixed. Accordingly, a toner having excellent heat resistant storage stability and low temperature fixing ability can be obtained. Moreover, the toner has excellent results in terms of a releasing width (a difference between the minimum fixing temperature and hot offset occurring temperature).

The crystalline polyester resin is obtained from a polyhydric alcohol and a multivalent carboxylic acid or a derivative thereof such as a multivalent carboxylic acid anhydride and a multivalent carboxylic acid ester.

Note that, in the present invention, the crystalline polyester resin is one obtained by using a polyhydric alcohol, and a multivalent carboxylic acid or derivatives thereof such as a multivalent carboxylic acid, a multivalent carboxylic acid anhydride, and a multivalent carboxylic acid ester, as described above, and a product obtained by modifying a polyester resin (for example, the prepolymer, and a resin obtained through cross-linking and/or chain elongation reaction of the aforementioned prepolymer) do not belong to the crystalline polyester resin.

Presence of crystallinity of the crystalline polyester resin of the present invention can be confirmed using a crystal analysis X-ray diffraction device (for example, X' PERT PRO MRD, product of Philips). Measurement method is described hereinafter.

First, a sample is ground in a mortar, to obtain a sample powder. The obtained sample powder is uniformly coated on a sample holder. Then, the sample holder is set to the diffraction device, and is measured, to obtain diffraction spectrum.

When, in the peaks obtained within a range of 20°<2θ<25° in the obtained diffraction peaks, a peak half value width of a peak having the largest peak intensity is 2.0 or less, it is judged to have crystallinity.

In the present invention, a polyester resin that does not exhibit the above condition is referred to as a non-crystalline polyester resin, compared to the crystalline polyester resin.

Measurement conditions of X-ray diffraction are described as follows.

—Measurement Conditions—
Tension kV: 45 kV
Current: 40 mA
MPSS
Upper
Gonio
Scanmode: continuos
Start angle: 3°
End angle: 35°
Angle Step: 0.02°
Lucident beam optics
Divergence slit: Div slit 1/2
Difflection beam optics
Anti scatter slit: As Fixed 1/2
Receiving slit: Prog rec slit
—Polyhydric Alcohol—

The polyhydric alcohol is not particularly limited and may be appropriately selected depending on the intended purpose. Examples thereof include diol, and trihydric or higher alcohol.

Examples of the diol include saturated aliphatic diol. Examples of the saturated aliphatic diol include straight chain saturated aliphatic diol, and branched-chain saturated aliphatic diol. Among them, straight chain saturated aliphatic diol is preferable, and straight chain saturated aliphatic diol having having 2 to 12 carbon atoms is more preferable. When the saturated aliphatic diol has a branched-chain structure, crystallinity of the crystalline polyester resin may be low, and thus may lower the melting point. When the number of carbon atoms in the saturated aliphatic diol is more than 12, it may be difficult to yield a material in practice. The number of carbon atoms is preferably 12 or less.

Examples of the saturated aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among them, ethylene glycol, 1,4-butanediol, 1,6-hexanediol, 1,8-octanediol, 1,10-decanediol, and 1,12-dodecanediol are preferable, as they give high crystallinity to a resulting crystalline polyester resin, and give excellent sharp melt properties.

Examples of the trihydric or higher alcohol include glycerin, trimethylol ethane, trimethylolpropane, and pentaerythritol. These may be used alone or in combination of two or more thereof.

—Multivalent Carboxylic Acid—

The multivalent carboxylic acid is not particularly limited and may be appropriately selected depending on the intended purpose. Examples thereof include bivalent carboxylic acid, and trivalent or higher carboxylic acid.

Examples of the bivalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid of dibasic acid, such as phthalic acid, isophthalic acid, terephthalic acid, naphthalene-2,6-dicarboxylic acid, malonic acid, and mesaconic acid; and anhydrides of the foregoing compounds, and lower (having 1 to 3 carbon atoms) alkyl ester of the foregoing compounds.

Examples of the trivalent or higher carboxylic acid include 1,2,4-benzenetricarboxylic acid, 1,2,5-benzenetricarboxylic acid, 1,2,4-naphthalene tricarboxylic acid, anhydrides thereof, and lower (having 1 to 3 carbon atoms) alkyl esters thereof.

Moreover, the multivalent carboxylic acid may contain, other than the saturated aliphatic dicarboxylic acid or aromatic dicarboxylic acid, dicarboxylic acid containing a sulfonic acid group. Further, the multivalent carboxylic acid may contain, other than the saturated aliphatic dicarboxylic acid or aromatic dicarboxylic acid, dicarboxylic acid having a double bond. These may be used alone or in combination of two or more thereof.

The crystalline polyester resin is preferably composed of a straight chain saturated aliphatic dicarboxylic acid having 4 to 12 carbon atoms and a straight chain saturated aliphatic diol having 2 to 12 carbon atoms. Specifically, the crystalline polyester resin preferably contains a constituent unit derived from a saturated aliphatic dicarboxylic acid having 4 to 12 carbon atoms, and a constituent unit derived from a saturated aliphatic diol having 2 to 12 carbon atoms. As a result of this, crystallinity increases, and sharp melt properties improves, and therefore it is preferable as excellent low temperature fixing ability of the toner is exhibited.

A melting point of the crystalline polyester resin is not particularly limited and may be appropriately selected depending on the intended purpose, but it is preferably 60° C. to 80° C. When the melting point thereof is less than 60° C., the crystalline polyester resin tends to melt at low temperature, which may impair heat resistant storage stability of the toner. When the melting point thereof is more than 80° C., melting of the crystalline polyester resin with heat applied during fixing may be insufficient, which may impair low temperature fixing ability of the toner.

A molecular weight of the crystalline polyester resin is not particularly limited and may be appropriately selected depending on the intended purpose. Since those having a sharp molecular weight distribution and low molecular weight have excellent low temperature fixing ability, and heat resistant storage stability of the resultant toner lowers as an amount of a low molecular weight component, an o-dichlorobenzene soluble component of the crystalline polyester resin preferably has the weight average molecular weight (Mw) of 3,000 to 30,000, number average molecular weight (Mn) of 1,000 to 10,000, and Mw/Mn of 1.0 to 10, as measured by GPC. Further, it is more preferred that the weight average molecular weight (Mw) thereof be 5,000 to 15,000, the number average molecular weight (Mn) thereof be 2,000 to 10,000, and the Mw/Mn be 1.0 to 5.0.

An acid value of the crystalline polyester resin is not particularly limited and may be appropriately selected depending on the intended purpose, but it is preferably 5 mg KOH/g or more, more preferably 10 mg KOH/g or more for achieving the desired low temperature fixing ability in view of affinity between paper and the resin. Meanwhile, the acid value thereof is preferably 45 mg KOH/g or lower for the purpose of improving hot offset resistance.

A hydroxyl value of the crystalline polyester resin is not particularly limited and may be appropriately selected depending on the intended purpose. However, it is preferably 0 mg KOH/g to 50 mg KOH/g, more preferably 5 mg KOH/g to 50 mg KOH/g, in order to achieve the desired low temperature fixing ability and excellent charging property.

A molecular structure of the crystalline polyester resin can be confirmed by solution-state or solid-state NMR, X-ray diffraction, GC/MS, LC/MS, or IR spectroscopy. Simple methods for confirming the molecular structure thereof include a method for detecting, as a crystalline polyester resin, one that has absorption based on δCH (out-of-plane bending vibration) of olefin at 965 $cm^{-1\pm10}$ $cm^{-1}$ and 990 $cm^{-1\pm10}$ $cm^{-1}$ in an infrared absorption spectrum.

An amount of the crystalline polyester resin is not particularly limited and may be appropriately selected depending on the intended purpose, but it is preferably 3 parts by mass to 20 parts by mass, more preferably 5 parts by mass to 15 parts by mass, relative to 100 parts by mass of the toner. When the amount thereof is less than 3 parts by mass, the crystalline polyester resin is insufficient in sharp melt property, and thus the resultant may be deteriorated in heat resistant storage stability. When it is more than 20 parts by mass, the resultant toner may be deteriorated in heat resistant storage stability, and fogging of an image may be caused. When the amount thereof is within more preferable range than the aforementioned range, it is advantageous that the resultant toner is excellent in both high image quality and low temperature fixing ability.

<Other Components>

Examples of the aforementioned other components include a release agent, a colorant, a charge controlling agent, an external additive, a flow improving agent, a cleaning improving agent, and a magnetic material.

—Release Agent—

The release agent is appropriately selected from those known in the art without any limitation.

Examples of wax serving as the release agent include: natural wax, such as vegetable wax (e.g., carnauba wax, cotton wax, Japan wax and rice wax), animal wax (e.g., bees wax and lanolin), mineral wax (e.g., ozokelite and ceresine) and petroleum wax (e.g., paraffin wax, microcrystalline wax and petrolatum).

Examples of the wax other than the above natural wax include a synthetic hydrocarbon wax (e.g., Fischer-Tropsch wax and polyethylene wax; and a synthetic wax (e.g., ester wax, ketone wax and ether wax).

An amount of the release agent is not particularly limited and may be appropriately selected depending on the intended purpose, but it is preferably 2 parts by mass to 10 parts by mass, more preferably 3 parts by mass to 8 parts by mass, relative to 100 parts by mass of the toner.

—Colorant—

The colorant is not particularly limited and may be appropriately selected depending on the intended purpose. Examples thereof include a black pigment, a yellow pigment, a magenta pigment, and a cyan pigment.

An amount of the colorant is not particularly limited and may be appropriately selected depending on the intended purpose, but it is preferably 1 part by mass to 15 parts by mass, more preferably 3 parts by mass to 10 parts by mass, relative to 100 parts by mass of the toner.

The colorant may also be used as a master batch where the colorant is mixed with a resin. As a resin used in the production of the master batch or a resin kneaded together with the master batch, for example, other than the another polyester resin, stylene or substitution thereof (e.g., polystyrene, poly-p-chlorostyrene, and polyvinyl toluene) can be appropriately selected depending on the intended purpose.

The master batch can be prepared by mixing and kneading the colorant with the resin for the master batch. In the mixing and kneading, an organic solvent may be used for improving the interactions between the colorant and the resin. Moreover, the master batch can be prepared by a flashing method in which an aqueous paste containing a colorant is mixed and kneaded with a resin and an organic solvent, and then the colorant is transferred to the resin to remove the water and the organic solvent. This method is preferably used because a wet cake of the colorant is used as it is, and it is not necessary to dry the wet cake of the colorant to prepare a colorant.

—Charge Controlling Agent—

The charge controlling agent is not particularly limited and may be appropriately selected depending on the intended purpose. Examples thereof include a nigrosine-based dye, a triphenylmethane-based dye, a chromium-containing metallic complex dye, a molybdic acid chelate pigment, a rhodamine-based dry, alkoxy-based amine, a quarternary ammonium salt (including a fluorine-modified quarternary ammonium salt), alkylamide, a simple substance or a compound of phosphorus, a simple substance or a compound of tungsten, a fluorine-based activator, a salicylic acid metallic salt, and a metallic salt of salicylic acid derivative.

An amount of the charge controlling agent is not particularly limited and may be appropriately selected depending on the intended purpose, but it is preferably 0.1 parts by mass to 10 parts by mass, more preferably 0.2 parts by mass to 5 parts by mass, relative to 100 parts by mass of the toner.

—External Additive—

As for the external additive, other than oxide particles, a combination of inorganic particles and hydrophobic-treated inorganic particles can be used. The average particle diameter of primary particles of the hydrophobic-treated particles is preferably 1 nm to 100 nm, and more preferable 5 nm to 70 nm.

The external additive is not particularly limited and may be appropriately selected depending on the intended purpose. Examples thereof include silica particles, hydrophobic silica, fatty acid metal salts (e.g., zinc stearate, and aluminum stearate), metal oxide (e.g., titania, alumina, tin oxide, and antimony oxide), and a fluoropolymer.

As a favorable additive, hydrophobic silica, titania, titanium oxide, and alumina fine particles are preferable.

An amount of the external additive is not particularly limited and may be appropriately selected depending on the intended purpose, but it is preferably 0.1 parts by mass to 5 parts by mass, more preferably 0.3 parts by mass to 3 parts by mass, relative to 100 parts by mass of the toner.

—Flowability Improving Agent—

The flowability improving agent is not particularly limited and may be appropriately selected depending on the intended purpose so long as it is capable of performing surface treatment of the toner to increase hydrophobicity, and preventing degradations of flow properties and charging properties of the toner even in a high humidity environment. Examples thereof include a silane-coupling agent, a sililation agent, a silane-coupling agent containing a fluoroalkyl group, an organic titanate-based coupling agent, an aluminum-based coupling agent, silicone oil, and modified silicone oil. It is particularly preferred that the silica or the titanium oxide be used as hydrophobic silica or hydrophobic titanium oxide treated with the aforementioned flow improving agent.

—Cleanability Improving Agent—

The cleanability improving agent is not particularly limited and may be appropriately selected depending on the intended purpose so long as it can be added to the toner for the purpose of removing the developer remaining on a photoconductor or a primary transfer member after transferring. Examples thereof include: fatty acid metal salt such as zinc stearate, calcium stearate, and stearic acid; and polymer particles produced by soap-free emulsion polymerization, such as polymethyl methacrylate particles, and polystyrene particles.

—Magnetic Material—

The magnetic material is not particularly limited and may be appropriately selected depending on the intended purpose. Examples thereof include iron powder, magnetite, and ferrite. Among them, a white magnetic material is preferable in terms of a color tone.

<Toner Properties>
<<Average Circularity>>

Toner particles having small particle diameter and uniform particle diameter result in poor cleanability of the toner, and thus an average circularity thereof is preferably 0.970 or less. First, the relation between a shape of toner particles and transferability will be described hereinafter. When a full color copying device configured to transfer developed images of two or more colors is used, an amount of the toner remaining on the photoconductor increases, and the conventional toners having an indefinite shape cannot difficultly improve transferring efficiency, compared to the monochrome copying device configured to use a black toner. Moreover, use of the conventional toners having a ununiform shape may easily cause filming and fusion of the toner on the surface of the photoconductor and the intermediate transfer member due to shear stress and brushing force between the photoconductor and the cleaning member, between the intermediate transfer member and the cleaning member, and/or the photo-conductor and the intermediate transfer member, and thus transferring efficiency may be easily deteriorated. In the course of the production of full color images, four color images are difficult to uniformly transfer. Moreover, use of the intermediate transfer member may easily cause problems with color unevenness and color balance, and it is not easy to stably output full color images having high quality.

An average circularity thereof is preferably 0.970 or less in terms of balance between blead cleaning and transferring efficiency.

<<Glass Transition Temperature>>

A glass transition temperature (Tg1st) of the toner is preferably 20° C. to 50° C., where the glass transition temperature (Tg1st) is a glass transition temperature measured in first heating of differential scanning calorimetry (DSC) of the toner.

In conventional toners, when a Tg thereof is about 50° C. or less, the conventional toners tend to cause aggregation of toner particles because it is influenced by temperature variations during transportation or storage of the toner in summer or in a tropical region. As a result, the toner particles are solidified in a toner bottle, or adherence of the toner particles may be caused within a developing unit. Moreover, supply failures due to clogging of the toner in the toner bottle, and formation of defected images due to adherence of the toner may be caused.

A toner of the present invention has a lower Tg than the conventional toners. However, the polyester resin contained as a low Tg component in the toner, is nonlinear, and thus the toner of the present invention can retain heat resistant storage stability. In particular, when the polyester resin has a urethane bond or a urea bond responsible for high aggregation force, the resultant toner may significantly exhibit more excellent effects in retaining heat resistant storage stability.

A glass transition temperature (Tg2nd) is not particularly limited and may be appropriatelyselected depending on the intended purpose, but it is preferably 0° C. to 30° C., more preferably 10 ° C. to 30° C., where the glass transition temperature (Tg2nd) is a glass transition temperature measured in second heating of differential scanning calorimetry (DSC) of the toner.

A difference (Tg1st-Tg2nd) is not particularly limited and may be appropriately selected depending on the intended purpose, but it is preferably more than 0° C. (i.e., Tg1st>Tg2nd), more preferably 10 ° C. or more, where the Tg1st is a glass transition temperature measured in first heating of differential scanning calorimetry (DSC) of the toner, and the difference (Tg1st-Tg2nd) is a difference between the Tg1st and the Tg2nd. An upper limit of the difference is not particularly limited and may be appropriately selected depending on the intended purpose, but the difference (Tg1st-Tg2nd) is preferably 50° C. or less.

When the toner of the present invention contains a crystalline polyester resin, the crystalline polyester resin existing in a non-compatible state before heating (before the first heating) is compatible with the polyester resin after heating (after the first heating).

When the Tg1st is less than 20° C., the resultant toner is deteriorated in heat resistant storage stability, causes blocking in a developing device, and causes filming in a photoconductor. When the Tg1st is more than 50° C., the toner is deteriorated in low temperature fixing ability.

When the Tg2nd is less than 0° C., blocking resistance of the fixed images (printed images) may be deteriorated. When the Tg2nd is more than 30° C., low temperature fixing ability and glossiness of the toner cannot be obtained in some cases.

<Calculation Methods and Analysis Methods of Various Properties of Toner and Constituent Component of Toner>

A SP value, a Tg, an acid value, a hydroxyl value, a molecular weight, and a melting point of the polyester resin, the crystalline polyester resin, and the release agent may be each measured. Alternatively, each component may be separated from an actual toner by gel permeation chromatography (GPC) or the like, and each of the separated components may be subjected to the analysis methods described hereinafter, to determine physical properties such as a SP value, a Tg, a molecular weight, a melting point, and a mass ratio of constituent components.

Separation of each component by GPC can be performed, for example, by the following method.

In GPC measurement using THF (tetrahydrofuran) as a mobile phase, an eluate is subjected to fractionation by a fraction collector, a fraction corresponding to a part of a desired molecular weight is collected from a total area of an elution curve.

The combined eluate is concentrated and dried by an evaporator or the like, and a resulting solid content is dissolved in a deuterated solvent, such as deuterated chloroform, and deuterated THF, followed by measurement of $^1$H-NMR. From an integral ratio of each element, a ratio of a constituent monomer of the resin in the elution composition is calculated.

As another method, after concentrating the eluate, hydrolysis is performed with sodium hydroxide or the like, and a ratio of a constituent monomer is calculated by subjecting the decomposed product to a qualitative and quantitative analysis by high performance liquid chromatography (HPLC).

Note that, in the case where the toner is produced by generating the polyester resin through a chain-elongation reaction and/or croslink reaction of the non-linear reactive precursor and the curing agent to produce toner base particles, the polyester resin may be separated from an actual toner by GPC or the like, to determine a Tg thereof. Alternatively, the toner may be produced by synthesizing the polyester resin through a chain-elongation reaction and/or crosslink reaction of the non-linear reactive precursor and the curing agent, to measure a Tg thereof from the synthesized polyester resin.

<<Separation Unit for Toner Constituent Components>>

One example of a separation unit for each component during analysis of the toner will be specifically described hereinafter.

First, 1 g of the toner is added to 100 mL of THF, and the mixture is stirred for 30 minutes at 25° C., to obtain a solution in which soluble components are dissolved.

The solution is then filtered through a membrane filter having an opening of 0.2 mm, to obtain THF soluble matter in the toner.

Next, the THF soluble matter are dissolved in THF, to prepare a sample for measurement of GPC, and the prepared sample is supplied to GPC used for molecular weight measurement of each resin mentioned above.

Meanwhile, a fraction collector is disposed at an eluate outlet of GPC, to fraction the eluate per a certain count. The eluate is obtained per 5% in terms of the area ratio from the elution onset on the elution curve (raise of the curve).

Next, each eluted fraction, as a sample, in an amount of 30 mg is dissolved in 1 mL of deuterated chloroform, and to this solution, 0.05% by volume of tetramethyl silane (TMS) is added as a standard material.

A glass tube for NMR having a diameter of 5 mm is charged with the solution, from which a spectrum is obtained by a nuclear magnetic resonance apparatus (JNM-AL 400, product of JEOL Ltd.) by performing multiplication 128 times at temperature of 23° C. to 25° C.

The monomer compositions and the compositional ratios of the polyester resin and the crystalline polyester resin in the toner are determined from peak integral ratios of the obtained spectrum.

For example, an assignment of a peak is performed in the following manner, and a constituent monomer component ratio is determined from each integral ratio.

The assignment of a peak is as follows:

Around 8.25 ppm: derived from a benzene ring of trimellitic acid (for one hydrogen atom)

Around the region of 8.07 ppm to 8.10 ppm: derived from a benzene ring of terephthalic acid (for four hydrogen atoms)

Around the region of 7.1 ppm to 7.25 ppm: derived from a benzene ring of bisphenol A (for four hydrogen atoms)

Around 6.8 ppm: derived from a benzene ring of bisphenol A (for four hydrogen atoms), and derived from a double bond of fumaric acid (for two hydrogen atoms)

Around the region of 5.2 ppm to 5.4 ppm: derived from methine of bisphenol A propylene oxide adduct (for one hydrogen atom)

Around the region of 3.7 ppm to 4.7 ppm: derived from methylene of a bisphenol A propylene oxide adduct (for two hydrogen atoms), and derived from methylene of a bisphenol A ethylene oxide adduct (for four hydrogen atoms)

Around 2.2 ppm to 2.6 ppm: derived from methylene of an aliphatic dicarboxylic acid (for two hydrogen atoms)

Around 1.6 ppm: derived from a methyl group of bisphenol A (for six hydrogen atoms).

From these results, for example, an extracted product collected in a fraction containing the polyester resin in an amount of 90% by mass or more can be treated as the polyester resin.

Similarly, the extracted product collected in a fraction containing the crystalline polyester resin in an amount of 90% by mass or more can be treated as the crystalline polyester resin.

<<Measurement Methods of Melting Point and Glass Transition Temperature (Tg)>>

In the present invention, a melting point and a glass transition temperature (Tg) of the toner can be measured, for example, by a differential scanning calorimeter (DSC) system (Q-200, product of TA Instruments Japan Inc.).

Specifically, a melting point and a glass transition temperature of samples can be measured in the following manners.

Specifically, first, an aluminum sample container charged with about 5.0 mg of a sample is placed on a holder unit, and the holder unit is then set in an electric furnace. Next, the sample is heated (first heating) from −80° C. to 150° C. at the heating rate of 10 ° C./min in a nitrogen atmosphere. Then, the sample is cooled from 150° C. to −80° C. at the cooling rate of 10 ° C./min, followed by again heating (second heating) to 150° C. at the heating rate of 10 ° C./min. DSC curves are respectively measured for the first heating and the second heating by a differential scanning calorimeter (Q-200, product of TA Instruments Japan Inc.).

The DSC curve for the first heating is selected from the obtained DSC curve by an analysis program stored in the Q-200 system, to determine a glass transition temperature of the sample with the first heating. Similarly, the DSC curve for the second heating is selected, and the glass transition temperature of the sample with the second heating can be determined.

Moreover, the DSC curve for the first heating is selected from the obtained DSC curve by the analysis program stored in the Q-200 system, and an endothermic peak top temperature of the sample for the first heating is determined as a melting point of the sample. Similarly, the DSC curve for the second heating is selected, and the endothermic peak top temperature of the sample for the second heating can be determined as a melting point of the sample with the second heating.

In the present invention, when a toner is used as a sample, a glass transition temperature for the first heating is represented as Tg1st, and a glass transition temperature for the second heating is represented as Tg2nd.

Moreover, in the present invention, regarding the glass transition temperature and the melting point of the polyester resin, the crystalline polyester resin, and the other constituent components such as the release agent, the endothermic peak top temperature and the Tg in second heating are defined as the melting point and the Tg of each of the target samples, respectively, unless otherwise specified.

<Average Circularity>

An average circularity of the toner can be measured using a flow particle image analyzer FPIA-2000 (TOA Medical Electronics Co., Ltd.). Specifically, as a dispersing agent, 0.1 mL to 0.5 mL of a surfactant (alkyl benzene sulfonate is preferable) is added to 100 mL to 150 mL of water in which solid impurities are removed in advance in a vessel, followed by further adding 0.1 g to 0.5 g of the measurement sample thereto. The suspension obtained by dispersing the sample is subjected to the dispersion treatment for 1 minute to 3 minutes by an ultrasonic wave disperser. A concentration of the dispersion liquid is adjusted to 3,000 particles/µL, to 10,000 particles/µL, and a shape and a distribution of the dispersion liquid are measured using the aforementioned device.

<<Measurement of Molecular Weight>>

The molecular weight of each of the constituent components of the toner can be measured by the following method, for example.

Gel permeation chromatography (GPC) measuring apparatus: GPC-8220GPC (product of TOSOH CORPORATION)
Column: TSKgel Super HZM-H 15 cm, 3 columns connected (product of TOSOH CORPORATION)
Temperature: 40° C.
Solvent: Tetrahydrofuran (THF)
Flow rate: 0.35 mL/min
Sample: 0.15% by mass sample (0.4 mL) applied Pretreatment of sample: The toner is dissolved in tetrahydrofuran (THF) (containing a stabilizer, product of Wako Pure Chemical Industries, Ltd.) in a concentration of 0.15% by mass, and the solution is filtrated with a 0.2-mm filter. The resultant filtrate is used as a sample.

This THF sample solution (100 mL) is applied for measurement.

In the measurement of the molecular weight of the sample, the molecular weight distribution of the sample is determined based on the relationship between the logarithmic value and the count number of a calibration curve given by using several monodisperse polystyrene-standard samples. The standard polystyrene samples used for giving the calibration curve are Showdex STANDARD Std. Nos. S-7300, S-210, S-390, S-875, S-1980, S-10.9, S-629, S-3.0 and S-0.580 (these products are of SHOWA DENKO K. K.).

The detector used is a refractive index (RI) detector.

<<Measurement of Hydroxyl Value and Acid Value>>

The hydroxyl value can be measured according to the method of JIS K0070-1966.

The acid value can be measured according to the method of JIS K0070-1992.

<Method for Producing Toner>

A method for producing the toner is not particularly limited and may be appropriately selected depending on the intended purpose. The toner can be preferably granulated by dispersing an oil phase in an aqueous phase, where the oil phase contains the polyester resin and the layered inorganic mineral of which surface is treated with a fluorine-containing compound, and preferably contains the crystalline polyester resin, and further contains the release agent and the colorant if necessary.

Moreover, the toner can be preferably granulated by dispersing an oil phase in an aqueous phase, where the oil phase contains, as the polyester resin, a polyester resin (i.e., a prepolymer) including at least one selected from a urethane bond and a urea bond, a polyester resin including neither a urethane bond nor a urea bond, and the layered inorganic mineral of which surface is treated with the fluorine-containing compound; preferably contains the crystalline polyester resin; and further contains the curing agent, the release agent, and the colorant if necessary.

One example of such methods for producing the toner is a known dissolution suspension method. As one example of the methods for producing the toner, a method for forming toner base particles while forming the polyester resin through elongating reaction and/or cross-linking reaction between the prepolymer and the curing agent will be described hereinafter. This method includes preparing an aqueous medium, preparing an oil phase containing toner materials, emulsifying or dispersing the toner materials, and removing an organic solvent.

—Preparation of Aqueous Medium (Aqueous Phase)—

The preparation of the aqueous phase can be carried out, for example, by dispersing resin particles in an aqueous medium. An amount of the resin particles added to the aqueous medium is not particularly limited and may be appropriately selected depending on the intended purpose, but it is preferably 0.5 parts by mass to 10 parts by mass relative to 100 parts by mass of the aqueous medium.

The aqueous medium is not particularly limited and may be appropriately selected depending on the intended purpose. Examples thereof include water, a solvent miscible with water, and a mixture thereof. These may be used alone or in combination of two or more thereof. Among them, water is preferable.

The solvent miscible with water is not particularly limited and may be appropriately selected depending on the intended purpose. Examples thereof include alcohol, dimethyl formamide, tetrahydrofuran, cellosolve, and lower ketone. The alcohol is not particularly limited and may be appropriately selected depending on the intended purpose. Examples thereof include methanol, isopropanol, and ethylene glycol. The lower ketone is not particularly limited and may be appropriately selected depending on the intended purpose. Examples thereof include acetone and methyl ethyl ketone.

—Preparation of Oil Phase—

Preparation of the oil phase containing the toner materials can be performed by dissolving or dispersing toner materials in an organic solvent, where the toner materials contain a polyester resin (i.e., prepolymer) containing at least one selected from a urethane bond and a urea bond; a polyester containing neither a urethane bond nor a urea bond; and a layered inorganic mineral of which surface is treated with a fluorine-containing compound, and further contain the crystalline polyester, the curing agent, the release agent, and the colorant.

The organic solvent is not particularly limited and may be appropriately selected depending on the intended purpose, but it is preferably an organic solvent having a boiling point of less than 150° C., as removal thereof is easy.

The organic solvent having the boiling point of less than 150° C. is not particularly limited and may be appropriately selected depending on the intended purpose. Examples thereof include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These may be used alone or in combination of two or more thereof. Among them, ethyl acetate, toluene, xylene, benzene, methylene chloride, 1,2-dichloroethane, chloroform, and carbon tetrachloride are particularly preferable, and ethyl acetate is more preferable.

—Emulsification or Dispersion—

The emulsification or dispersion of the toner materials can be performed by dispersing the oil phase containing the toner materials in the aqueous medium. In the course of the emulsification or dispersion of the toner materials, the curing agent is allowed to react with the prepolymer through a elongation reaction and/or cross-linking reaction.

The reaction conditions (e.g., reaction time and reaction temperature) for producing the prepolymer are not particularly limited and may be appropriately selected depending on combinations of the curing agent and the polyester prepolymer.

The reaction time is not particularly limited and may be appropriately selected depending on the intended purpose, but it is preferably 10 minutes to 40 hours, more preferably 2 hours to 24 hours.

The reaction temperature is not particularly limited and may be appropriately selected depending on the intended purpose, but it is preferably 0° C. to 150° C., more preferably 40° C. to 98° C.

A method for stably forming a dispersion liquid containing the prepolymer in the aqueous medium is not particularly limited and may be appropriately selected depending on the intended purpose. Examples thereof include a method for dispersing an oil phase, which is added to an aqueous medium, with shear force, where the oil phase is prepared by dissolving or dispersing toner materials in a solvent.

A disperser used for the dispersing is not particularly limited and may be appropriately selected depending on the intended purpose. Examples thereof include a low-speed shearing disperser, a high-speed shearing disperser, a friction disperser, a high-pressure jetting disperser and an ultrasonic wave disperser.

Among them, the high-speed shearing disperser is preferable, because it can control the particle diameters of the dispersed elements (oil droplets) to the range of 2 mm to 20 mm.

In the case where the high-speed shearing disperser is used, the conditions for dispersing, such as the rotating speed, dispersion time, and dispersion temperature, may be appropriately selected depending on the intended purpose.

The rotational speed is not particularly limited and may be appropriately selected depending on the intended purpose, but it is preferably 1,000 rpm to 30,000 rpm, more preferably 5,000 rpm to 20,000 rpm.

The dispersion time is not particularly limited and may be appropriately selected depending on the intended purpose, but it is preferably 0.1 minutes to 5 minutes in case of a batch system.

The dispersion temperature is not particularly limited and may be appropriately selected depending on the intended purpose, but it is preferably 0° C. to 150° C., more preferably 40° C. to 98° C. under pressure. Note that, generally speaking, dispersion can be easily carried out, as the dispersion temperature is higher.

An amount of the aqueous medium used for the emulsification or dispersion of the toner material is not particularly limited and may be appropriately selected depending on the intended purpose, but it is preferably 50 parts by mass to 2,000 parts by mass, more preferably 100 parts by mass to 1,000 parts by mass, relative to 100 parts by mass of the toner material.

When the amount of the aqueous medium is less than 50 parts by mass, the dispersion state of the toner material is impaired, which may result a failure in attaining toner base particles having desired particle diameters. When the amount thereof is more than 2,000 parts by mass, the production cost may increase.

When the oil phase containing the toner material is emulsified or dispersed, a dispersing agent is preferably used for the purpose of stabilizing dispersed elements, such as oil droplets, and gives a shape particle size distribution as well as giving desirable shapes of toner particles.

The dispersing agent is not particularly limited and may be appropriately selected depending on the intended purpose. Examples thereof include a surfactant, a water-insoluble inorganic compound dispersing agent, and a polymer protective colloid. These may be used alone or in combination of two or more thereof. Among them, the surfactant is preferable.

The surfactant is not particularly limited and may be appropriately selected depending on the intended purpose. Examples thereof include an anionic surfactant, a cationic surfactant, a nonionic surfactant, and an amphoteric surfactant.

The anionic surfactant is not particularly limited and may be appropriately selected depending on the intended purpose. Examples thereof include alkyl benzene sulfonic acid salts, a-olefin sulfonic acid salts and phosphoric acid esters. Among them, those having a fluoroalkyl group are preferable.

—Removal of Organic Solvent—

A method for removing the organic solvent from the dispersion liquid such as the emulsified slurry is not particularly limited and may be appropriately selected depending on the intended purpose. Examples thereof include: a method in which an entire reaction system is gradually heated to evaporate out the organic solvent in the oil droplets; and a method in which the dispersion liquid is sprayed in a dry atmosphere to remove the organic solvent in the oil droplets.

As the organic solvent removed, toner base particles are formed. The toner base particles can be subjected to washing and drying, and can be further subjected to classification. The classification may be carried out in a liquid by removing small particles by cyclone, a decanter, or centrifugal separator, or may be performed on particles after drying.

The obtained toner base particles may be mixed with particles such as the external additive and the charge controlling agent. At this time, by applying a mechanical impact during mixing, the particles such as the external additive can be prevented from fall off from surfaces of toner base particles.

A method for applying the mechanical impact is not particularly limited and may be appropriately selected depending on the intended purpose. Examples thereof include: a method for applying impulse force to a mixture by a blade rotating at high speed; a method for adding a mixture into a high-speed air flow and accelerating the speed of the flow to make the particles crash into other particles, or make the composite particles crush into an appropriate impact board.

A device used for this method is appropriately selected depending on the intended purpose without any limitation, and examples thereof include ANGMILL (product of HOSOKAWA MICRON CORPORATION), an apparatus produced by modifying I-type mill (product of Nippon Pneumatic Mfg. Co., Ltd.) to reduce the pulverizing air pressure, a hybridization system (product of Nara Machinery Co., Ltd.), a kryptron system (product of Kawasaki Heavy Industries, Ltd.) and an automatic mortar.

(Developer)

A developer of the present invention contains at least the toner, and may further contain appropriately selected other components, such as carrier, if necessary.

Accordingly, the developer has excellent transfer properties, and charging ability, and can stably form high quality images. Note that, the developer may be a one-component developer, or a two-component developer, but it is preferably a two-component developer when it is used in a high speed printer corresponding to recent high information processing speed, because the service life thereof can be improved.

<Carrier>

The carrier is appropriately selected depending on the intended purpose without any limitation, but it is preferably a carrier containing a core, and a resin layer covering the core.

(Image Forming Apparatus and Image Forming Method)

An image forming apparatus of the present invention includes at least an electrostatic latent image bearer, an electrostatic latent image forming unit, and a developing unit, and if necessary, further includes other units.

An image forming method of the present invention includes at least an electrostatic latent image forming step and a developing step, and if necessary, further includes other steps.

The image forming method can suitably be performed by the image forming apparatus, the electrostatic latent image forming step can suitably be performed by the electrostatic latent image forming unit, the developing step can suitably be performed by the developing unit, and the other steps can suitably be performed by the other units.

<Electrostatic Latent Image Bearer>

The material, structure and size of the electrostatic latent image bearer are not particularly limited and may be appropriately selected depending on the intended purpose. Examples of the material thereof include inorganic photoconductors such as amorphous silicon and selenium and organic photoconductors such as polysilane and phthalopolymethine.

<Electrostatic Latent Image Forming Unit>

The electrostatic latent image forming unit is not particularly limited and may be appropriately selected depending on the intended purpose so long as it is a unit configured to form an electrostatic latent image on the electrostatic latent image bearer. Examples thereof include a unit including at least a charging member configured to charge a surface of the electrostatic latent image bearer and an exposing member configured to imagewise expose the surface of the electrostatic latent image bearer to light.

<Developing Unit>

The developing unit is not particularly limited and may be appropriately selected depending on the intended purpose so long as it is a developing unit containing a toner for developing the electrostatic latent image formed on the electrostatic latent image bearer to form a visible image.

<Other Units>

Examples of the other units include a transfer unit, a fixing unit, a cleaning unit, a charge-eliminating unit, a recycling unit, and a controlling unit.

Next, one aspect of performing a method for forming an image using an image forming apparatus of the present invention will be described with reference to FIG. 1. A color image forming apparatus 100A illustrated in FIG. 1 includes a photoconductor drum 10 (hereinafter may be referred to as "photoconductor 10") serving as the electrostatic latent image bearer, a charging roller 20 serving as the charging unit, an exposing device 30 serving as the exposing unit, a developing device 40 serving as the developing unit, an intermediate transfer member 50, a cleaning device 60 including a cleaning blade serving as the cleaning blade, and a charge-eliminating lamp 70 serving as the charge-eliminating unit.

The intermediate transfer member 50, which is an endless belt, is stretched around three rollers 51 disposed in the belt, and is designed to be movable in a direction indicated by the arrow. A part of three rollers 51 also functions as a transfer bias roller which can apply a predetermined transfer bias (primary transfer bias) to the intermediate transfer member 50. Near the intermediate transfer member 50, a cleaning device 90 including a cleaning blade is disposed. Also, a transfer roller 80 serving as the transfer unit which can apply a transfer bias onto a transfer paper 95 serving as the recording medium for transferring (secondary transferring) an developed image (toner image) is disposed facing the intermediate transfer member 50. Around the intermediate transfer member 50, a corona charging device 58 for applying a charge to the toner image on the intermediate transfer member 50 is disposed between a contact portion of the photoconductor 10 with the intermediate transfer member 50 and a contact portion of the intermediate transfer member 50 with the transfer paper 95 in a rotational direction of the intermediate transfer member 50.

The developing device 40 is composed of a developing belt 41 serving as the developer bearing member; and a black developing unit 45K, a yellow developing unit 45Y, a magenta developing unit 45M, and a cyan developing unit 45C, which are disposed around the developing belt 41. Note that, the black developing unit 45K includes a developer accommodating unit 42K, a developer supplying roller 43K, and a developing roller 44K. The yellow developing unit 45Y includes a developer accommodating unit 42Y, a developer supplying roller 43Y, and a developing roller 44Y. The magenta developing unit 45M includes a developer accommodating unit 42M, a developer supplying roller 43M, and a developing roller 44M. The cyan developing unit 45C includes a developer accommodating unit 42C, a developer supplying roller 43C, and a developing roller 44C. Moreover, the developing belt 41, which is an endless belt, is stretched so as to be movable around a plurality of belt rollers, and a part of the developing belt 41 contacts with the electrostatic latent image bearer 10.

In the color image forming apparatus 100 illustrated in FIG. 1, for example, the photoconductor drum 10 is uniformly charged by the charging roller 20. Then, the exposing device 30 imagewise exposes the photoconductor drum 10, to form an electrostatic latent image. Next, the electrostatic latent image formed on the photoconductor drum 10 is developed by supplying a developer from the developing device 40, to form a toner image. The toner image is transferred (primarily transferred) onto the intermediate transfer member 50, and is further transferred (secondary transferring) onto the transfer paper 95 by voltage applied from the roller 51. As a result, a transferred image is formed on the transfer paper 95. Note that, a residual toner remaining on the photoconductor 10 is removed by the cleaning device 60, and a charge on the photoconductor 10 is once eliminated by the charge-eliminating lamp 70.

FIG. 2 illustrates another example of an image forming apparatus of the present invention. The image forming apparatus illustrated in FIG. 2 include a copying device main body 150, a paper feeding table 200, a scanner 300, and an automatic document feeder (ADF) 400.
An intermediate transfer member 50, which is an endless belt type, is disposed at a central part of the copying device main body 150. The intermediate transfer member 50 is stretched around support rollers 14, 15, and 16, and can rotate in a clockwise direction in FIG. 2. Near the support roller 15, an intermediate transfer member cleaning device 17 is disposed in order to remove a residual toner remaining on the intermediate transfer member 50. On the intermediate transfer member 50 stretched around the support roller 14 and the support roller 15, a tandem type developing device 120, in which four image forming units 18 of yellow, cyan, magenta, and black are arranged in parallel so as to face the intermediate transfer member 50 along a conveying direction, is disposed. Near the tandem type developing device 120, an exposing device 21 serving as the exposing member is disposed. A secondary transfer device 22 is disposed on a side of the intermediate transfer member 50 opposite to a side where the tandem type developing device 120 is disposed. In the secondary transfer device 22, a secondary transfer belt 24, which is an endless belt, and is stretched around a pair of rollers 23. The transfer paper conveyed on the secondary transfer belt 24 and the intermediate transfer member 50 can contact each other. Near the secondary transfer device 22, a fixing device 25 serving as the fixing unit is disposed. The fixing device 25 includes a fixing belt 26 which is an endless belt, and a press roller 27 which is disposed so as to be pressed against the fixing belt 26. Here, in the tandem type image forming apparatus, a sheet inverting device 28 configured to invert the transfer paper is disposed near the secondary transfer device 22 and the fixing device 25, in order to form an image on both sides of the transfer paper.

Next, a method for forming a full-color image (color-copying) using the tandem type developing device 120 will be described. First, a color document is set on a document table 130 of the automatic document feeder (ADF) 400. Alternatively, the automatic document feeder 400 is opened, the color document is set on a contact glass 32 of the scanner 300, and the automatic document feeder 400 is closed.

When a start button (not illustrated) is pressed, the scanner 300 activates after the color document is conveyed and moved to the contact glass 32 in the case the color document has been set on the automatic document feeder 400, or right away in the case the color document has been set on the contact glass 32, so that a first travelling body 33 and a second travelling body 34 travel. At this time, light is irradiated from a light source in the first travelling body 33, the light reflected from a surface of the document is reflected by a mirror in the second travelling body 34 and then is received by a reading sensor 36 through an imaging forming lens 35. Thus, the color document (color image) is read to form black, yellow, magenta and cyan image information.

Each image information of black, yellow, magenta, and cyan is transmitted to each of the image forming units 18 (black image forming unit, yellow image forming unit, magenta image forming unit, and cyan image forming unit) in the tandem type developing device 120, and the toner images of black, yellow, magenta, and cyan are each formed in the image forming units. The image forming units 18 (black image forming unit, yellow image forming unit, magenta image forming unit, and cyan image forming unit) in the tandem type developing device 120 include: electrostatic latent image bearers 10 (black electrostatic latent image bearer 10K, yellow electrostatic latent image bearer 10Y, magenta electrostatic latent image bearer 10M, and cyan electrostatic latent image bearer 10C); a charging device 160 configured to uniformly charge the electrostatic latent image bearers 10, serving as the charging unit; an exposing device configured to imagewise expose the electrostatic latent image bearers to light based on image information for each color, to form an electrostatic latent image corresponding to color images on the electrostatic latent image bearers; a developing device 61 configured to develop the electrostatic latent images with color toners (black toner, yellow toner, magenta toner, and cyan toner) to form a toner image of each of the color toners; a transfer charger 62 configured to transfer the toner image onto the intermediate transfer member 50; a cleaning device 63; and a charge-eliminating unit 64. Each mage forming unit 18 can form a monochrome image (black image, yellow image, magenta image, and cyan image) based on image information of each color. Thus formed black image (i.e., black image formed onto the black electrostatic latent image bearer 10K), yellow image (i.e., yellow image formed onto the yellow electrostatic latent image bearer 10Y), magenta image (i.e., magenta image formed onto the magenta electrostatic latent image bearer 10M), and cyan image (i.e., cyan image formed onto the cyan electrostatic latent image bearer 10C) are sequentially transferred (primarily transferred) onto the intermediate transfer member 50 which is rotatably moved by the support rollers 14, 15 and 16. The black image, the yellow image, the magenta image, and the cyan image are superposed on top of one another on the intermediate transfer member 50 to form a composite color image (color transfer image).

Meanwhile, on the paper feeding table 200, one of paper feeding rollers 142 is selectively rotated to feed a sheet (recording paper) from one of the paper feeding cassettes 144 equipped in multiple stages in a paper bank 143. The sheet is separated one by one by a separation roller 145 and sent to a paper feeding path 146. The sheet (recording paper) is conveyed by a conveying roller 147 and is guided to a paper feeding path 148 in the copying device main body 150, and stops by colliding with a registration roller 49. Alternatively, a paper feeding roller 142 is rotated to feed a sheet (recording paper) on a manual feed tray 54. The sheet (recording paper) is separated one by one by a separation roller 52 and is guided to a manual paper feeding path 53, and stops by colliding with the registration roller 49. Notably, the registration roller 49 is generally used while grounded, but it may also be used in a state that a bias is being applied for removing paper dust on the sheet. Next, by rotating the registration roller 49 in accordance with the timing of the composite toner image (color transferred image) formed on the intermediate transfer member 50, the sheet (recording paper) is fed to between the intermediate transfer member 50 and the secondary transfer device 22. Then, the composite toner image (color transferred image) is transferred (secondarily transferred) by the secondary transfer device 22 onto the sheet (recording paper) to form a color image on the sheet (recording paper). Notably, a residual toner remaining on the intermediate transfer member 50 after image transfer is removed by the cleaning device for the intermediate transfer member 17.

The sheet (recording paper) on which the color image has been transferred is conveyed by the secondary transfer device 22, and then conveyed to the fixing device 25. In the fixing device 25, the composite color image (color transferred image) is fixed on the sheet (recording paper) by the action of heat and pressure. Next, the sheet (recording paper) is switched by a switching claw 55, and discharged by a discharge roller 56 and stacked in a paper ejection tray 57. Alternatively, the sheet is switched by the switching claw 55, and is inverted by the inverting device 28 to be guided to a transfer position again. After an image is formed similarly on the rear surface, the recording paper is discharged by the discharge roller 56 stacked in the paper ejection tray 57.

EXAMPLES

The present invention will be described hereinafter. The present invention may not be construed as being limited to the Examples. Unless otherwise specified, "part(s)" means "part(s) by mass", and "%" means "% by mass".

Each of the measurements in the following Examples was measured based on the methods described herein. Here, each of the resins obtained in Production Examples was used to measure a Tg and a molecular weight of the polyester resin and the crystalline polyester resin.

Production Example 1

<Preparation of Unmodified Polyester Resin>

A reaction vessel equipped with a condenser, a stirring device, and a nitrogen-introducing tube was charged with 229 parts of bisphenol A ethylene oxide 2 mole adduct, 529 parts of bisphenol A propylene oxide 3 mole adduct, 208 parts of terephthalic acid, 46 parts of adipic acid, and 2 parts of dibutyltin oxide, and the mixture was allowed to react under normal pressure at 230° C. for 8 hours. Next, the mixture was further allowed to react under a reduced pressure of 10 mm Hg to 15 mm Hg for 5 hours, 44 parts of trimellitic anhydride was added to the reaction vessel, and the resultant mixture was allowed to react under normal pressure at 180° C. for 2 hours, to synthesize an unmodified polyester resin.

The obtained unmodified polyester resin was found to have a number average molecular weight of 2,500, a weight average molecular weight of 6,000, a glass transition temperature of 43° C., an acid value of 25 mg KOH/g.

Production Example 2

<Preparation of Master Batch>

Water (1,200 parts), 540 parts of carbon black PRINTEX 35 (product of Degussa, DBP oil absorption amount =42 mL/100 mg, pH =9.5), and 1,200 parts of the unmodified polyester resin were mixed using HENSCHEL MIXER (product of Mitsui Mining Co., Ltd.). The obtained mixture was kneaded by a two roll mill for 30 minutes at 150° C. The kneaded product was rolled out and cooled, followed by pulverizing by a pulverizer (product of HOSOKAWA MICRON CORPORATION), to obtain a master batch.

Production Example 3

<Preparation of Wax Dispersion Liquid>

A vessel to which a stirring bar and a thermometer had been set was charged with 378 parts of the unmodified polyester resin, 110 parts of the carnauba wax, 22 parts of salicylic acid metal complex E-84 (product of ORIENT CHEMICAL INDUSTRIES CO., LTD.), and 947 parts of ethyl acetate, and the mixture was heated to 80° C. during stirring. The temperature was maintained at 80° C. for 5 hours, and then the mixture was cooled to 30° C. for 1 hour. Next, 500 parts of the master batch and 500 parts of ethyl acetate were charged into the vessel, and were mixed for 1 hour, to obtain a materials dissolving solution.

The obtained materials dissolving solution (1,324 parts) was transferred to a reaction vessel, and C. I. pigment red and the carnauba wax were dispersed therein by a bead mill (ULTRA VISCOMILL, product of AIMEX CO., Ltd.) under the following conditions: a liquid feed rate of 1 kg/hr, disc circumferential velocity of 6 m/s, zirconia beads having a diameter of 0.5 mm packed to 80% by volume, and 3 passes, to obtain a wax dispersion liquid.

Production Example 4

<Preparation of Layered Inorganic Mineral A>

The modified layered inorganic mineral montmorillonite (CLAYTONA PA, product of Southern Clay Products), at least one of which is modified with quaternary ammonium salt having a benzyl group (100 parts) was added to water (1,200 parts), and the mixture was stirred and dispersed using a T. K. HOMO DISPER (product of Tokushu Kika Kogyo Co., Ltd.) for 15 minutes, to obtain a slurry of the layered inorganic mineral. Then, 1 part of the silane coupling agent (trifluoropropyl trimethoxysilane) was added thereto, and the mixture was further stirred for 10 minutes. The obtained slurry was filtrated, was dried in an oven at 150° C. for 90 minutes, and was pulverized with a ball mill, to obtain layered inorganic mineral A.

Production Example 5

<Preparation of Layered Inorganic Mineral B>

First, 100 parts of the unmodified layered inorganic mineral montmorillonite (product name: KUNIPIA, product of KUNIMINE INDUSTRIES CO., LTD.) was added to 1,200 parts of water, and the mixture was stirred and dispersed for 15 minutes using a T. K. HOMO DISPER (product of Tokushu Kika Kogyo Co., Ltd.) to obtain a slurry of the layered inorganic mineral. Then, 1 part of the silane coupling agent (trifluoropropyl trimethoxysilane) was added thereto, and the mixture was further stirred for 10 minutes. The obtained slurry was filtrated, was dried in an oven at 150° C. for 90 minutes, and was pulverized with a ball mill, to obtain layered inorganic mineral B.

Production Example 6

<Preparation of Layered Inorganic Mineral C>

The inorganic mineral montmorillonite (CLAYTON HY, product of Southern Clay Products) (100 parts), at least one of which is modified with an ammonium salt having a polyoxyethylene group, was added to 1,200 parts of water, and the mixture was stirred and dispersed for 15 minutes using a T. K. HOMO DISPER (product of Tokushu Kika Kogyo Co., Ltd.) to obtain a slurry of the layered inorganic mineral. Then, 1 part of the silane coupling agent (trifluoropropyl trimethoxysilane) was added thereto, and the mixture was further stirred for 10 minutes. The obtained slurry was filtrated, was dried in an oven at 150° C. for 90 minutes, and was pulverized with a ball mill, to obtain layered inorganic mineral C.

Production Example 7

<Preparation of Prepolymer>

A reaction vessel equipped with a condenser, a stirring device, and a nitrogen-introducing tube was charged with 682 parts of bisphenol A ethylene oxide 2 mole adduct, 81 parts of bisphenol A propylene oxide 2 mole adduct, 283 parts of terephthalic acid, 22 parts of trimellitic anhydride, and 2 parts of dibutyltin oxide, and the mixture was allowed to react under normal pressure at 230° C. for 8 hours. Next, the mixture was further allowed to react under a reduced pressure of 10 mm Hg to 15 mm Hg for 5 hours, to synthesize an intermediate polyester resin.

The obtained intermediate polyester resin was found to have a number average molecular weight of 2,100, a weight average molecular weight of 9,500, a glass transition temperature of 55° C., an acid value of 0.5 mg KOH/g, and a hydroxyl value of 51 mg KOH/g.

Next, a reaction vessel equipped with a condenser, a stiffing device, and a nitrogen-introducing tube was charged with 410 parts of the intermediate polyester resin, 89 parts of isophorone diisocyanate, and 500 parts of ethyl acetate, and the mixture was allowed to react at 100° C. for 5 hours, to synthesize a prepolymer. An amount of a free isocyanate of the obtained prepolymer was 1.53% by mass.

Production Example 8

<Synthesis of Ketimine Compound>

A vessel to which a stirring bar and a thermometer had been set was charged with isophorone diamine (170 parts) and methyl ethyl ketone (75 parts), and the mixture was allowed to react at 50° C. for 5 hours, to synthesize a ketimine compound.

The obtained ketimine compound was found to have an amine value of 418 mg KOH/g.

Example 1

<Preparation of Dispersion Liquid of Toner Materials>

A 65% by mass ethyl acetate solution of the unmodified polyester resin (1,324 parts) was added to the wax dispersion liquid. The mixture was dispersed by ULTRA VISCOMILL under the following conditions: a liquid feed rate of 1 kg/hr, disc circumferential velocity of 6 m/s, zirconia beads having a diameter of 0.5 mm packed to 80% by volume, and 1 passes, to obtain a dispersion liquid. Then, 1 part of the layered inorganic mineral A was added to 200 parts of the obtained dispersion liquid, followed by stirring by a T. K. HOMO DISPER (product of Tokushu Kika Kogyo Co., Ltd.) for 30 minutes, to obtain a dispersion liquid of toner materials.

<Preparation of Oil Phase Mixture Liquid>

A reaction vessel was charged with 749 parts of the dispersion liquid of toner materials, 115 parts of prepolymer, and 2.9 parts of the ketimine compound, followed by mixing by a T K Homomixer (product of Tokushu Kika Kogyo Co., Ltd.) at 5,000 rpm for 1 minutes, to obtain an oil phase mixture liquid.

<Preparation of Resin Particles Dispersion Liquid>

A vessel to which a stirring bar and a thermometer had been set was charged with 683 parts of water, 11 parts of the reactive emulsifier (ELEMINOL RS-30, sodium ester sulphate of ethylene oxide adduct of methacrylic acid, product of Sanyo Chemical Industries, Ltd.), 83 parts of styrene, 83 parts of methacrylic acid, 110 parts of butyl acrylate, and 1 part of ammonium persulphate, and the mixture was stirred at 400 rpm for 15 minutes, to obtain an emulsion. The emulsion was heated to 75° C. and allowed to react for 5 hours. Then, 30 parts of a 1% by mass aqueous solution of ammonium persulfate was added thereto, and the mixture was aged at 75° C for 5 hours, to obtain a resin particles dispersion liquid.

<Preparation of Aqueous Medium>

Water (990 parts), 83 parts of the resin particles dispersion liquid, 37 parts of a 48.5% aqueous solution of sodium dodecyldiphenyl ether disulfonate (ELEMINOL MON-7, product of Sanyo Chemical Industries Ltd.), 135 parts of CELLOGEN BS-H-3 (product of DKS Co. Ltd.), which is a 1% by mass of aqueous solution of CMC (sodium carboxymethyl cellulose) as a polymer dispersing agent, and 90 parts of ethyl acetate were mixed and stirred, to obtain an aqueous medium.

<Preparation of Toner>

The oil phase mixture liquid (867 parts) was added to 1,200 parts of the aqueous medium, the mixture was mixed by a TK Homomixer at 13,000 rpm for 20 minutes, to prepare a dispersion liquid (emulsified slurry).

Next, a vessel to which a stirring bar and a thermometer had been set was charged with the emulsified slurry, followed by removing the solvent at 30° C. for 8 hours. Thereafter, the resultant product was aged at 45 ° C. for 4 hours, to obtain a dispersion slurry.

The dispersion slurry (100 parts by mass) was subjected to filtrate under a reduced pressure to obtain a filtration cake. Then, 100 parts of ion-exchanged water was added to the filtration cake, the mixture was mixed by a TK Homomixer at 12,000 rpm for 10 minute, followed by filtration.

A 10% by mass hydrochloric acid was added to the obtained filtration cake so that a pH of the filtration cake was adjusted to 2.8, and the mixture was mixed by a TK Homomixer at 12,000 rpm for 10 minute, followed by filtration. Moreover, 300 parts of ion-exchanged water was added to the obtained filtration cake, the mixture was mixed by a TK Homomixer at 12,000 rpm for 10 minute, followed by filtration. The aforementioned procedures were carried out two times to obtain a final filtration cake.

Then, the obtained final filtration cake was dried with an air-circulating drier at 45° C. for 48 hours, and then was caused to pass through a sieve with a mesh size of 75 mm, to obtain toner base particles.

Then, 1.0 parts of the hydrophobic silica as an external additive and 0.5 parts of the hydrophobic titanium oxide were added to 100 parts of the obtained toner base particles, followed by treating the mixture using HENSCHEL MIXER (product of Mitsui Mining Co., Ltd.), to produce toner particles (toner 1).

<Preparation of Developer>

A developer was prepared by mixing the toner and the carrier used for the digital full-color copying machine, IMAGEO MP C4300 (product of Ricoh Company, Ltd.) so that a concentration of the toner was 5% by mass.

Next, the prepared developer was used for evaluating properties as follows. Results are given in Tables 1-1 and 1-2.

<Low Temperature Fixing Ability and Hot Offset>

The developer was charged into a unit of the digital full-color copying machine, IMAGEO MP C4300 (product of Ricoh Company, Ltd.), and a solid image having a rectangle of 2 cm×15 cm was formed on a sheet of PPC PAPER TYPE 6,000 <70W>(A4, long-grain paper, product of Ricoh Company, Ltd.) so that an amount of the toner deposited thereon was 0.40 mg/cm$^2$. At this time, the surface temperature of the fixing roller was changed, and then whether toner offset occurs was observed. Here, the toner offset means that the developed image of the solid image was fixed at a place other than the desired place. Then, low temperature fixing ability (cold offset) and hot offset were evaluated.

—Evaluation Criteria of Low Temperature Fixing Ability—
A: Less than 110° C.
B: 110° C. or more but less than 120° C.
C: 120° C. or more but less than 130° C.
D: 130° C. or more —Evaluation Criteria of Hot Offset—
A: 170° C. or more
B: 160° C. or more but less than 170° C.
C: 150° C. or more but less than 160° C.
D: Less than 150° C.

<Background Fog>

A digital full-color copying machine IMAGEO MP C4300 (product of Ricoh Company, Ltd.) was used to perform a running test for outputting 30,000 sheets on which an image chart having an imaging area of 50% was printed in a monochrome mode. Then, during developing, the image on white paper was allowed to stop, and a piece of tape was used to transfer the developer remaining on the photoconductor after the developing, to measure a difference between image density of the untransferred tape and the image density of the transferred tape using a 938 spectrodensitometer (product of X-Rite).

When a difference between the image density of the transferred tape and the image density of the untransferred tape is low, it means that the background fog is suppressed. Here, "A" means that the background fog is suppressed the most; "B" means that the background fog is suppressed the second most; "C" means that the background fog is suppressed the third most; and "D" means that the background fog is suppressed the worst.

<Toner Scattering>

A digital full-color copying machine (IMAGIO COLOR 2800, product of Ricoh Company, Ltd.) was used to continuously print images for 50,000 sheets, and then contamination of the toner particles in the device was observed.

Here, "A" means being not problematic; "B" means that the toner particles are observed in the device, which is not problematic for use; and "C" means that the device is significantly contaminated, which is problematic.

<Cleanabilty>

Onto white paper, a piece of Scotch tape (product of Sumitomo 3M Limited) was used to transfer toner particles remaining after transfer on a photoconductor which had undergone a cleaning step, and then the transferred toner particles were measured using a Macbeth reflection densitometer RD514. Here, "A (good)" means that a difference between a measurement of the transferred toner particles and a measurement of a blank is 0.01 or less, and "B (poor)" means that the difference is more than 0.01.

<Evaluation of Charging Ability>

1) Charge amount after stirring for 1 minute

Each of the obtained toners (10 g) and a ferrite carrier (100 g) were charged into a stainless pot in an environment of temperature of 28° C. and humidity of 80% such that the materials reached 30% of an internal volume of the pot. The mixture was stirred for 15 seconds at a stiffing speed of 100 rpm, to measure a charge amount (μC/g) of the developer using [TB-200: Toshiba Chemical Corporation].

A charge amount was measured based on blow-off method.

2) Charge amount after stirring for 10 minutes

A charge amount after stirring for 10 minutes was measured in the same manner as in the above 1).

<Charging Stability>

(1) Charging stability under environment of high temperature and high humidity

Under environment of temperature of 40° C. and humidity of 90%, a digital full-color copying machine IMAGEO MP C4300 (product of Ricoh Company, Ltd.) was used to perform a running test for outputting 100,000 sheets on which an image chart having an imaging area of 7% was printed in a monochrome mode, while a part of the developer was taken out as a sample every 1,000 sheet. Then, a charge amount was measured based on blow-off method, to evaluate charging stability.

Here, "A" means that the change of the charge amount is 5 μc/g or less; "B" means that the change of the charge amount is more than 5 μc/g but 10 μc/g or less; and "C" means that the change of the charge amount is more than 10 μc/g.

(2) Charging stability under environment of low temperature and low humidity Under environment of temperature of 10° C. and humidity of 15%, a digital full-color copying machine IMAGEO MP C4300 (product of Ricoh Company, Ltd.) was used to perform a running test for outputting 100,000 sheets on which an image chart having an imaging area of 7% was printed in a monochrome mode, while a part of the developer was taken out as a sample every 1,000 sheet. Then, a charge amount was measured based on blow-off method, to evaluate charging stability.

Here, "A" means that the change of the charge amount is 5 μc/g or less; "B" means that the change of the charge amount is more than 5 μc/g but 10 μc/g or less; and "C" means that the change of the charge amount is more than 10 μc/g.

Measurement of the charge amounts by the blow-off method described in the above (1) and (2) was performed as follows. In a laboratory where a temperature is 20° C. and a humidity is 50%, each of the obtained toners (10 g) and a ferrite carrier (100 g) were charged into a stainless pot such that the materials reached 30% of an internal volume of the pot. The mixture was stirred for 10 minutes at a stirring speed of 100 rpm, to measure a charge amount (μC/g) of the developer using [TB-200: Toshiba Chemical Corporation].

Example 2

Toner 2 was produced in the same manner as in Example 1 except that an amount of the modified layered inorganic mineral (product name: CLAYTON APA) added was changed from 1 part to 0.1 parts. The toner 2 was evaluated in the same manner as in Example 1. Results are given in Table 1-1.

Example 3

Toner 3 was produced in the same manner as in Example 1 except that an amount of the modified layered inorganic mineral (product name: CLAYTON APA) added was changed from 1 part to 3 parts. The toner 3 was evaluated in the same manner as in Example 1. Results are given in Table 1-1.

Example 4

Toner 4 was produced in the same manner as in Example 1 except that the layered inorganic mineral A was changed to the layered inorganic mineral B. The toner 4 was evaluated in the same manner as in Example 1. Results are given in Table 1-1.

Example 5

Toner 5 was produced in the same manner as in Example 1 except that the layered inorganic mineral A was changed to the layered inorganic mineral C. The toner 5 was evaluated in the same manner as in Example 1. Results are given in Table 1-1.

Comparative Example 1

Toner 6 was produced in the same manner as in Example 1 except that the layered inorganic mineral A was changed to the modified layered inorganic mineral (product name: CLAYTON APA). The toner 6 was evaluated in the same manner as in Example 1. Results are given in Table 1-2.

Comparative Example 2

Toner 7 was produced in the same manner as in Example 1 except that the layered inorganic mineral A was changed to the unmodified layered inorganic mineral mont-morillonite (product name: KUNIPIA, product of KUNIMINE INDUSTRIES CO., LTD.). The toner 7 was evaluated in the same manner as in Example 1. Results are given in Table 1-2.

Comparative Example 3

Toner 8 was produced in the same manner as in Example 1 except that the following procedure was performed. After obtaining toner base particles, the toner base particles were mixed in an aqueous solvent dispersing a fluorine compound expressed by the following Structural Formula (X) so that an amount of the fluorine compound was 0.09 parts relative to an amount of the toner base particles. Then, the fluorine compound was attached (bound) on toner particles, the resultant toner particles were dried at 45 ° C. for 48 hours, and were caused to pass through a sieve with a mesh size of 75 μm.

(Chem. 1)

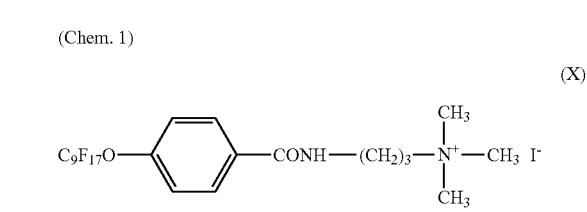

(X)

The toner 8 was evaluated in the same manner as in Example 1. Results are given in Table 1-2.

Comparative Example 4

Toner 9 was produced in the same manner as in Example 1 except that the layered inorganic mineral was not added. The toner 9 was evaluated in the same manner as in Example 1. Results are given in Table 1-2.

TABLE 1-1

|  |  | Example 1 Toner 1 | Example 2 Toner 2 | Example 3 Toner 3 | Example 4 Toner 4 | Example 5 Toner 5 |
|---|---|---|---|---|---|---|
| Charging ability | Charge amount after stirring for 1 minute (μC/g) | −42 | −37 | −44 | −40 | −40 |
|  | Charge amount after stirring for 10 minute (μC/g) | −45 | −38 | −46 | −43 | −44 |
| Charging stability | Environment of high temperature and high humidity | A | A | A | A | A |
|  | Environment of low temperature and low humidity | A | A | A | A | A |

TABLE 1-1-continued

|  | Example 1 Toner 1 | Example 2 Toner 2 | Example 3 Toner 3 | Example 4 Toner 4 | Example 5 Toner 5 |
| --- | --- | --- | --- | --- | --- |
| Background fog | A | A | B | A | A |
| Toner scattering | A | A | A | A | A |
| Cleanability | A | A | A | A | A |
| Average circularity | 0.962 | 0.965 | 0.959 | 0.968 | 0.963 |
| Low temperature fixing ability | B | A | C | B | B |
| Hot offset | A | A | A | A | A |

TABLE 1-2

| | | Comparative Example 1 Toner 6 | Comparative Example 2 Toner 7 | Comparative Example 3 Toner 8 | Comparative Example 4 Toner 9 |
| --- | --- | --- | --- | --- | --- |
| Charging ability | Charge amount after stirring for 1 minute (μC/g) | −32 | −29 | −35 | −25 |
| | Charge amount after stirring for 10 minute (μC/g) | −33 | −30 | −31 | −26 |
| Charging stability | Environment of high temperature and high humidity | B | C | B | C |
| | Environment of low temperature and low humidity | B | C | B | C |
| Background fog | | C | C | C | D |
| Toner scattering | | C | C | C | C |
| Cleanability | | A | A | A | B |
| Average circularity | | 0.962 | 0.968 | 0.962 | 0.975 |
| Low temperature fixing ability | | A | A | C | A |
| Hot offset | | A | A | A | B |

Aspects of the present invention are as follows, for example:

<1> A layered inorganic mineral including:
a surface treated with a fluorine-containing compound.

<2> The layered inorganic mineral according to <1>, wherein at least part of ions present between layers of the layered inorganic mineral is modified with organic ions.

<3> The layered inorganic mineral according to <1> or <2>, wherein the fluorine-containing compound includes a fluoroalkyl group.

<4> The layered inorganic mineral according to any one of <1> to <3>, wherein the fluorine-containing compound is a silane coupling agent.

<5> The layered inorganic mineral according to <4>, wherein the layered inorganic mineral binds a fluorine compound on the surface by the silane coupling agent.

<6> The layered inorganic mineral according to <5>, wherein the silane coupling agent is represented by the following General Formula (2):

$$RaSiRb_3 \quad \text{General Formula (2)},$$

where Ra is a hydrocarbon including a fluoromethyl group, and may have a functional group, and where Rb is a hydrolyzable group or a hydroxyl group.

<7> A toner including: the layered inorganic mineral according to any one of <1> to <6>.

<8> An image forming apparatus including: an electrostatic latent image bearer;
an electrostatic latent image forming unit configured to form an electrostatic latent image on the electrostatic latent image bearer; and
a developing unit containing a toner and configured to develop the electrostatic latent image formed on the electrostatic latent image bearer to form a visible image,
wherein the toner is the toner according to <7>.

The invention clamed is:

1. A toner comprising:
a layered inorganic mineral comprising a surface treated with a fluorine-containing compound, wherein the fluorine-containing compound comprises a fluoroalkyl group.

2. An image forming apparatus comprising:
an electrostatic latent image bearer;
an electrostatic latent image forming unit configured to form an electrostatic latent image on the electrostatic latent image bearer; and
a developing unit containing a toner and configured to develop the electrostatic latent image formed on the electrostatic latent image bearer to form a visible image,
wherein the toner is the toner according to claim 1.

3. The toner according to claim 1, wherein the layered inorganic mineral further comprises ions present between layers of the layered inorganic mineral, wherein at least a portion of the ions is modified with organic ions.

4. The toner according to claim 1, wherein the fluorine-containing compound is a silane coupling agent.

5. The toner according to claim 1, wherein the layered inorganic mineral binds a fluorine compound on the surface by the silane coupling agent.

6. The toner according to claim 4, wherein the silane coupling agent is represented by Formula (2):

$$RaSiRb_3 \quad (2),$$

wherein Ra is a hydrocarbon comprising a fluoromethyl group, the hydrocarbon optionally comprising a functional group, and Rb is a hydrolyzable group or a hydroxyl group.

* * * * *